US010437048B2

(12) United States Patent
Schowengerdt et al.

(10) Patent No.: US 10,437,048 B2
(45) Date of Patent: Oct. 8, 2019

(54) METHODS AND SYSTEMS FOR MULTI-ELEMENT LINKAGE FOR FIBER SCANNING DISPLAY

(71) Applicant: Magic Leap, Inc., Plantation, FL (US)

(72) Inventors: Brian T. Schowengerdt, Seattle, WA (US); Mathew D. Watson, Bellevue, WA (US); Charles David Melville, Camano Island, WA (US); William Andrew Lee, Palo Alto, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/851,317

(22) Filed: Dec. 21, 2017

(65) Prior Publication Data

US 2018/0180874 A1    Jun. 28, 2018

Related U.S. Application Data

(60) Provisional application No. 62/438,415, filed on Dec. 22, 2016.

(51) Int. Cl.
*G02B 26/10* (2006.01)
*G02B 6/02* (2006.01)
*G02B 6/44* (2006.01)
*G02B 27/18* (2006.01)
*G02B 6/00* (2006.01)

(52) U.S. Cl.
CPC ....... *G02B 26/103* (2013.01); *G02B 6/02042* (2013.01); *G02B 6/4439* (2013.01); *G02B 27/18* (2013.01); *G02B 2006/0098* (2013.01)

(58) Field of Classification Search
CPC .. G02B 26/103; G02B 26/10; G02B 6/02042; G02B 6/4439; G02B 6/00; G02B 6/02; G02B 6/44; G02B 27/18; G02B 2006/0098
See application file for complete search history.

(56) References Cited

U.S. PATENT DOCUMENTS

| | | | |
|---|---|---|---|
| 5,546,492 A * | 8/1996 | Ansley | G02B 6/06 345/8 |
| 5,739,624 A | 4/1998 | Kleiman | |
| 6,201,227 B1 | 3/2001 | Tomita | |
| 6,845,190 B1 * | 1/2005 | Smithwick | A61B 1/0008 385/1 |

(Continued)

OTHER PUBLICATIONS

PCT/US2017/067982, "International Search Report and Written Opinion", dated Mar. 20, 2018, 9 pages.

*Primary Examiner* — Andrew Jordan
(74) *Attorney, Agent, or Firm* — Kilpatrick Townsend & Stockton LLP

(57) ABSTRACT

A multi-element fiber scanner for scanning electromagnetic imaging radiation includes a base having a base plane and a longitudinal axis orthogonal to the base plane and a first fiber link passing through the base in a direction parallel to the longitudinal axis. The first fiber link is operatively coupled to at least one electromagnetic radiation source. The multi-element fiber scanner also includes a plurality of additional links joined to the base and extending from the base and a retention collar disposed a predetermined distance along the longitudinal axis from the base. The first fiber link and the plurality of fiber links are joined to the retention collar.

20 Claims, 14 Drawing Sheets

(56) References Cited

U.S. PATENT DOCUMENTS

| | | | | |
|---|---|---|---|---|
| 7,298,938 B2* | 11/2007 | Johnston | ............... | A61B 1/0008 |
| | | | | 385/15 |
| 7,312,879 B2* | 12/2007 | Johnston | ............... | A61B 5/0084 |
| | | | | 250/208.1 |
| 8,757,812 B2* | 6/2014 | Melville | ............... | A61B 1/0008 |
| | | | | 353/85 |
| 9,445,063 B2* | 9/2016 | Kim | ..................... | H04N 9/3129 |
| 9,872,606 B2* | 1/2018 | Yeoh | .................. | A61B 1/00165 |
| 9,952,350 B1* | 4/2018 | DiFoggio | .................. | G01V 8/16 |
| 10,151,875 B2* | 12/2018 | Schowengerdt | ......... | G02B 6/08 |
| 2004/0122328 A1* | 6/2004 | Wang | .................. | A61B 1/00048 |
| | | | | 600/476 |
| 2005/0009197 A1* | 1/2005 | Adams | .................. | G01Q 60/34 |
| | | | | 436/164 |
| 2007/0019906 A1* | 1/2007 | Melville | ................ | G02B 6/262 |
| | | | | 385/25 |
| 2008/0058629 A1* | 3/2008 | Seibel | .................. | A61B 1/0008 |
| | | | | 600/368 |
| 2009/0026888 A1* | 1/2009 | Melville | ............ | A61B 1/00096 |
| | | | | 310/335 |
| 2009/0092364 A1* | 4/2009 | Johnston | ............ | A61B 1/00096 |
| | | | | 385/117 |
| 2009/0218641 A1* | 9/2009 | Melville | ............... | H01L 41/092 |
| | | | | 257/415 |
| 2009/0244272 A1 | 10/2009 | Macaulay et al. | | |
| 2009/0316116 A1* | 12/2009 | Melville | ............... | A61B 1/0008 |
| | | | | 353/31 |
| 2012/0224824 A1 | 9/2012 | Beresnev et al. | | |
| 2014/0232993 A1* | 8/2014 | Kim | ..................... | H04N 9/3129 |
| | | | | 353/31 |
| 2016/0324403 A1* | 11/2016 | Yeoh | .................. | A61B 1/00165 |
| 2018/0103834 A1* | 4/2018 | Yeoh | .................. | A61B 1/00165 |
| 2018/0180874 A1* | 6/2018 | Schowengerdt | ... | G02B 6/02042 |

\* cited by examiner

METHODS AND SYSTEMS FOR MULTI-ELEMENT LINKAGE FOR FIBER SCANNING DISPLAY

CROSS-REFERENCES TO RELATED APPLICATIONS

This Application claims priority to U.S. Provisional Patent Application No. 62/438,415, filed on Dec. 22, 2016, entitled "Methods and Systems for Multi-Element Linkage for Fiber Scanning Display," the disclosure of which is hereby incorporated by reference in its entirety for all purposes.

The following regular U.S. Patent Applications (including this one) are being filed concurrently, and the entire disclosure of the other applications are incorporated by reference into this application for all purposes:

U.S. patent application Ser. No. 15/851,005, filed Dec. 21, 2017, entitled "SHAPED FIBER ELEMENTS FOR SCANNING FIBER DISPLAYS;"

U.S. patent application Ser. No. 15/851,049, filed Dec. 21, 2017, entitled "METHODS AND SYSTEMS FOR FABRICATION OF SHAPED FIBER ELEMENTS USING LASER ABLATION;" and U.S. patent application Ser. No. 15/851,317, filed on Dec. 21, 2017, entitled "METHODS AND SYSTEMS FOR MULTI-ELEMENT LINKAGE FOR FIBER SCANNING DISPLAY."

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems related to fiber scanning projection display systems. More particularly, embodiments of the present invention provide methods and systems for multi-element linkages that enable scanned fibers to oscillate in a plane, in a set of planes, or along an arc. The invention is applicable to a variety of applications in computer vision and image display systems.

According to an embodiment of the present invention, a multi-element fiber scanner for scanning electromagnetic imaging radiation is provided. The multi-element fiber scanner includes a base having a base plane and a longitudinal axis orthogonal to the base plane and a first fiber link passing through the base in a direction parallel to the longitudinal axis. The first fiber link is operatively coupled to at least one electromagnetic radiation source. The multi-element fiber scanner also includes a plurality of additional links joined to the base and extending from the base and a retention collar disposed a predetermined distance along the longitudinal axis from the base, wherein the first fiber link and the plurality of fiber links are joined to the retention collar. The plurality of additional links can extend from the base in a direction substantially parallel to the longitudinal axis. During operation, the multi-element fiber scanner can scan the electromagnetic imaging radiation along an axis parallel to the base plane.

According to another embodiment of the present invention, a method of fabricating a multi-element fiber scanner is provided. The method includes providing a fiber optic cable having a cladding region and a fiber core and focusing a laser beam at a series of predetermined locations inside the cladding region of the fiber optic cable. The method also includes creating a plurality of damage sites at the predetermined locations, exposing the fiber optic cable to an etchant solution, and preferentially etching the plurality of damage sites to form a base having a base plane and a longitudinal axis orthogonal to the base plane, a retention collar disposed a predetermined distance along the longitudinal axis from the base, a first fiber link including the fiber core, passing through the base plane, and joined to the retention collar, and a plurality of additional links joined to the base, extending from the base to the retention collar, and joined to the retention collar.

As an example, the method can further include rotating the fiber optic cable around the longitudinal axis during the creating the plurality of damage sites at the predetermined locations. Moreover, creating the plurality of damage sites at the predetermined locations can include forming a latticework of damage sites, which can include a plurality of radial vias passing through the cladding region towards the fiber core. In one implementation, creating the plurality of damage sites at the predetermined locations includes initially creating a first portion of the plurality of damage sites adjacent the fiber core and subsequently creating a second portion of the plurality of damage sites adjacent a periphery of the cladding region. In addition to a fiber cladding and a fiber core, the fiber optic cable can include a plurality of sacrificial regions disposed in the cladding region. The plurality of sacrificial regions can be air cavities or can include a material having a higher etch rate than the cladding region.

According to a specific embodiment of the present invention, a method of fabricating a multi-element fiber scanner is provided. The method includes fabricating a preform including structural precursors for at least one fiber waveguide, fiber supports, and sacrificial material and drawing the preform to form a fiber structure. The method also includes exposing the fiber structure to an etchant solution and preferentially etching the sacrificial material to form: a base having a base plane and a longitudinal axis orthogonal to the base plane, a retention collar disposed a predetermined distance along the longitudinal axis from the base, a first fiber link including the at least one fiber waveguide, passing through the base plane, and joined to the retention collar, and a plurality of fiber supports joined to the base, extending from the base to the retention collar, and joined to the retention collar.

According to another specific embodiment of the present invention, a method of operating a multi-element fiber scanner is provided. The method includes providing a source of electromagnetic radiation and directing electromagnetic radiation from the source through a first fiber link. The first fiber link passes through a base having a base plane and a longitudinal axis orthogonal to the base plane. The method also includes supporting a retention collar disposed a predetermined distance along the longitudinal axis from the base. A plurality of additional links join the base and the retention collar. The method further includes translating the base in the base plane, translating the retention collar in a set of planes parallel to the base plane, and scanning the electromagnetic radiation in one or more axes.

According to a particular embodiment of the present invention, a multi-element fiber scanner for scanning electromagnetic imaging radiation is provided. The multi-element fiber scanner includes a base having a base plane and a longitudinal axis orthogonal to the base plane and a first fiber link passing through the base in a direction parallel to the longitudinal axis. The first fiber link is operatively coupled to at least one electromagnetic radiation source. The multi-element fiber scanner also includes a plurality of actuation elements joined to the base and extending from the base along the longitudinal axis and a retention collar disposed a predetermined distance along the longitudinal axis from the base. The plurality of actuation elements can be arrayed surrounding the first fiber link. The first fiber link and the plurality of actuation elements are joined to the retention collar. During operation, the first fiber link is operable to scan the electromagnetic imaging radiation along an axis parallel to the base plane.

According to another particular embodiment of the present invention, a method of operating a multi-axis fiber scanner is provided. The method includes providing a source of electromagnetic radiation and directing electromagnetic radiation from the source through a first fiber link. The first fiber link passes through a base having a base plane and a longitudinal axis orthogonal to the base plane. The method also includes supporting a retention collar disposed a predetermined distance along the longitudinal axis from the base. A plurality of piezoelectric actuators join the base and the retention collar. A first piezoelectric actuator of the plurality of piezoelectric actuators joins one side of the base to one side of the retention collar. A second piezoelectric actuator of the plurality of piezoelectric actuators joins an opposing side of the base to an opposing side of the retention collar. The first piezoelectric actuator and the second piezoelectric actuator lie in a scanning plane. The method further includes actuating the first piezoelectric actuator of the plurality of piezoelectric actuators to decrease the distance from the one side of the base to the one side of the retention collar, actuating the second piezoelectric actuator of the plurality of piezoelectric actuators to increase the distance from the opposing side of the base to the opposing side of the retention collar, and scanning the first fiber link in the scanning plane. As described herein, the methods can include alternately actuating a first of the piezoelectric actuators to decrease or increase the distance at one side between the base and the retention collar while synchronously alternately actuating the second of the piezoelectric actuators to increase or decrease the distance on a second side between the base and the retention collar.

According to another embodiment of the present invention, a multi-element fiber scanner for scanning electromagnetic imaging radiation is provided. The multi-element fiber scanner includes a base having a base plane and a longitudinal axis orthogonal to the base plane and a first fiber link passing through the base in a direction parallel to the longitudinal axis. The first fiber link is operatively coupled to at least one electromagnetic radiation source. The multi-element fiber scanner also includes a plurality of motion actuation links joined to the base and extending from the base. Each of the plurality of motion actuation links includes a first piezoelectric element proximate to the base and a second piezoelectric element coupled to the first piezoelectric element at a location distal from the base. The multi-element fiber scanner further includes a retention collar disposed a predetermined distance along the longitudinal axis from the base. The first fiber link and the second piezoelectric element of each of the plurality of motion actuation links are joined to the retention collar. During operation, the first piezoelectric element contracts/expands as the second piezoelectric element expands/contracts.

According to yet another embodiment of the present invention, a multi-element fiber scanner for scanning electromagnetic imaging radiation is provided. The multi-element fiber scanner includes a base having a support surface defining a base plane, a mounting surface opposing the support surface, and a longitudinal axis orthogonal to the base plane and a plurality of motion actuators coupled to the support surface of the base. The multi-element fiber scanner also includes a multi-link fiber structure coupled the mounting surface. The multi-link fiber structure includes a fiber base and a fiber link passing through the fiber base in a direction parallel to the longitudinal axis. The fiber link is operatively coupled to at least one electromagnetic radiation source. The multi-link fiber structure also includes a plurality of motion actuation elements (e.g., piezoelectric actuators) joined to the fiber base and extending from the fiber base along the longitudinal axis and a retention collar disposed a predetermined distance along the longitudinal axis from the fiber base. The fiber link and the plurality of motion actuation elements are joined to the retention collar.

Numerous benefits are achieved by way of the present invention over conventional techniques. For example, embodiments of the present invention provide methods and systems that scan an optical fiber support in a substantially planar manner, thereby providing an image field having a known profile. These and other embodiments of the invention along with many of its advantages and features are described in more detail in conjunction with the text below and attached figures.

DETAILED DESCRIPTION OF SPECIFIC EMBODIMENTS

Embodiments of the present invention relate to methods and systems related to fiber scanning projection display systems. More particularly, embodiments of the present invention provide methods and systems for multi-element linkages that enable scanned fibers to oscillate in a plane or along an arc. The invention is applicable to a variety of applications in computer vision and image display systems.

Figure 1:
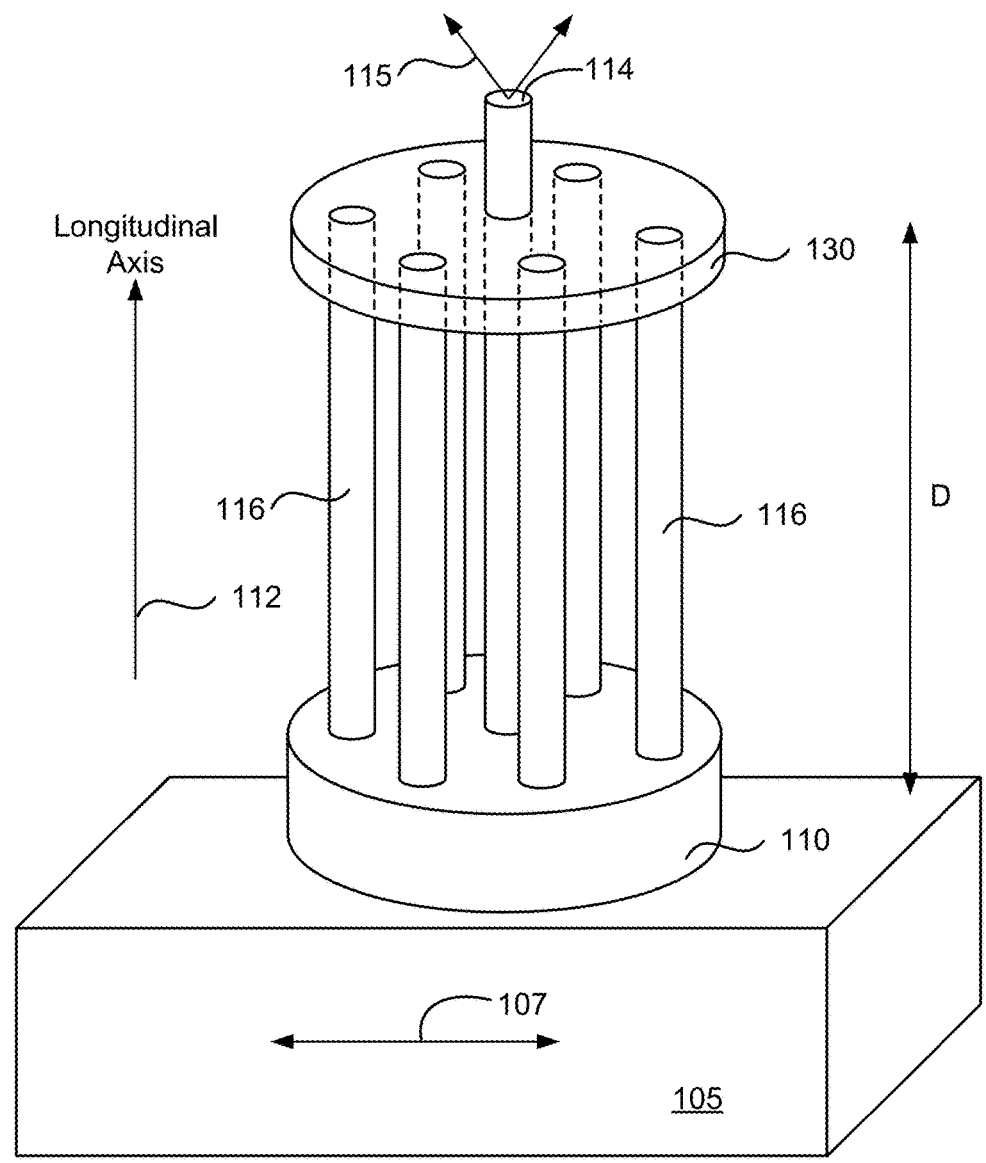
FIG. 1 is a simplified perspective drawing illustrating a multi-element fiber scanner according to an embodiment of the present invention.

FIG. 1 is a simplified perspective drawing illustrating a multi-element fiber scanner according to an embodiment of the present invention. The multi-element fiber scanner 100 can be used to scan electromagnetic imaging radiation, thereby forming an element of a display system. The multi-element fiber scanner includes a base 110, which can also be referred to as an actuator base. The base is disposed in a base plane and can be characterized by a longitudinal axis 112 that is orthogonal to the base plane.

The multi-element fiber scanner also includes a retention collar 130 that is disposed a predetermined distance D along the longitudinal axis 112 from the base 110. In some embodiments, the retention collar 130 is parallel to the base and orthogonal to the longitudinal axis. The region between the base 110 and the retention collar 130 can be referred to as a pillar section.

A first fiber link 114, which can also be referred to as a waveguide, passes through the base in a direction parallel to the longitudinal axis. The first fiber link 114 is operatively coupled to at least one electromagnetic radiation source (not shown) so that modulated light can be directed through the first fiber link while a distal end of the fiber tip is mechanically scanned in order to generate an image, which can then be coupled through a display system. The first fiber link can be fixed to the base at the location through which it passes through the base or may be free to move in the base plane. The first fiber link passes through the retention collar and can be fixed to the retention collar at the location through which it passes through the retention collar or may be free to move in the plane of the retention collar and/or free to move in the direction parallel to the longitudinal axis (i.e., axially). In some embodiments, the first fiber link passes through the retention collar in the direction parallel to the longitudinal axis.

In alternative embodiments, the first fiber link can be replaced with another optical waveguide structure that can be fabricated using processes other than fiber drawing processes, for example, using a micro-electro-mechanical system (MEMS) or a micro-opto-electro-mechanical system (MOEMS) microfabrication process. Thus, molded parts and optical waveguides fabricated using additive manufacturing are included within the scope of the present invention, for example, cantilevered structures, channel waveguides, and the like. These optical waveguide structures can be fabricated from a variety of materials including silicon, silicon carbide, silicon oxides, silicon nitrides, combinations thereof, and the like.

In addition to the first fiber link, a plurality of additional links 116 extend from the base. These addition links, which can be fabricated from glass materials, are joined at one end to the base and at the other end to the retention collar. As a result, the retention collar is mechanically joined to the additional links. The plane in which the retention collar is disposed can be considered as one of a set of motion planes since the retention collar will oscillate as it moves through this set of planes. In the embodiment illustrated in FIG. 1, the plurality of additional links are arrayed surrounding the first fiber link, but this is not required by the present invention. In other embodiments, the number and position of each of the addition links is modified as appropriate to the particular application. Moreover, although the plurality of additional links illustrated in FIG. 1 extend from the base in the direction parallel to the longitudinal axis, this is not required by the present invention as described more fully in relation to FIG. 3.

The additional links can provide just mechanical functionality or can also provide optical functionality. As an example, the additional links can be replaced with piezoelectric elements that can expand and contract to provide motion actuation. In these embodiments, one or more of the plurality of additional links can be operatively coupled to the at least one electromagnetic radiation source, or other electromagnetic radiation sources, and pass through the base parallel to the longitudinal axis and through the retention collar. In these embodiments, modulated light can be delivered through all of the fiber links providing optical functionality. It should be appreciated that the additional links can be fabricated in various manners and using various materials. Although some embodiments are described in terms of glass links fabricated from a fiber optic, the present invention is not limited to this material or method of manufacture and other materials and fabrication processes can be used in relation to the additional links.

Multiple core fiber scanners provide an array of sources associated with multiple pixels that can be scanned to produce the displayed image with a multiplied resolution as a function of the number of sources. In some embodiments, one set of the additional links is used for mechanical support and another set is used as additional light sources to complement the first fiber link. Thus, embodiments of the present invention include implementations with a single fiber core and mechanical supports (e.g., a plurality of peripheral supports), multiple fiber cores and mechanical supports, and multiple fiber cores providing both optical and mechanical functionality. The mechanical supports can be made of glass similar to the first fiber core or of other suitable materials with sufficient flexibility and rigidity, including piezoelectric materials, metals, ceramics, polymers, or the like. One of ordinary skill in the art would recognize many variations, modifications, and alternatives.

In an alternative embodiment, multiple fiber cores terminating at different longitudinal positions can be implemented in conjunction with the fiber scanners described herein. In this embodiment, the depth plane associated with each of the fiber cores can be varied to provide different signals at different depths.

Referring to FIG. 1, the multi-element fiber scanner can also include a piezoelectric actuator 105 that is mechanically coupled to the base 110. The piezoelectric actuator is operable to translate the base in the base plane, for example, laterally along direction 107 or in a transverse direction pointing into and out of the plane of the figure. As an example, the piezoelectric actuator 105, which can also be referred to as a base, could include multiple piezoelectric elements that can contract and expand as appropriate to produce the desired oscillations in the base. In embodiments in which the base is translated laterally, the first fiber link is scanned laterally in the plane of the figure and the electromagnetic imaging radiation is scanned along an axis parallel to the base plane. The light rays 115 emitted from the first fiber link are illustrated as light leaves the optical fiber 114.

Since the additional links are mechanically coupled to each other in both the base plane and the plane of the retention collar, motion of the base in the base plane, for example, using a piezoelectric actuator 105, will result in motion of the tops of the additional links, and the retention collar, in a set of planes parallel to the plane of the retention collar.

Figure 2:
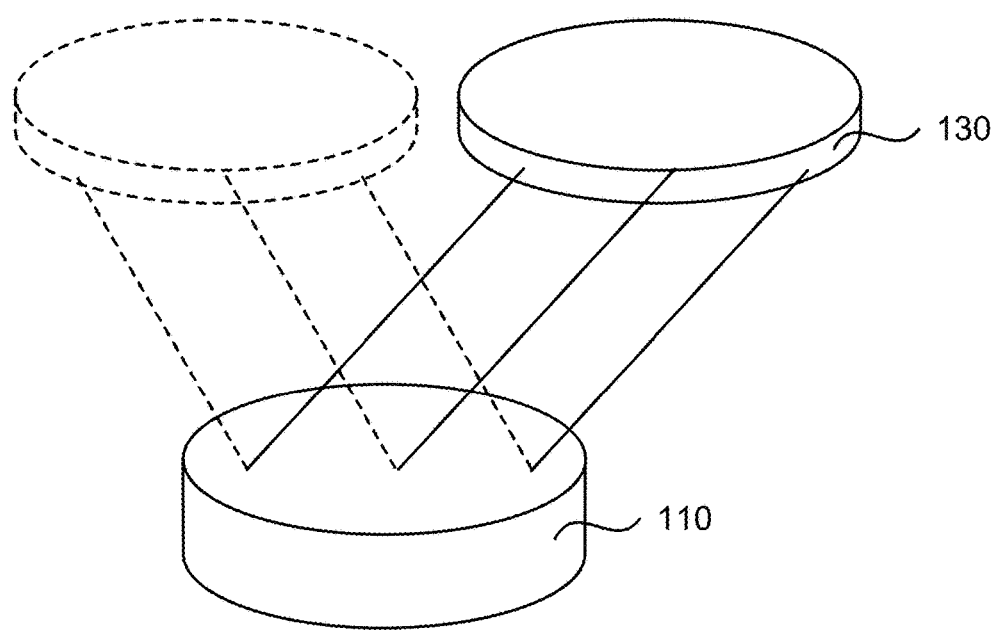
FIG. 2 is a simplified drawing illustrating two scanning positions for a multi-element fiber scanner according to an embodiment of the present invention.

FIG. 2 is a simplified drawing illustrating two scanning positions for a multi-element fiber scanner according to an embodiment of the present invention. As illustrated in FIG. 2, motion of the base 110 in the base plane will result in motion of the retention collar 130 horizontally (and vertically in some implementations). Two positions of the retention collar are shown, illustrating ends of an exemplary range of motion. At a center position in which the retention collar is directly above the base, the retention collar will be separated from the base by a greater vertical distance than at the illustrated positions. However, for small angles (e.g., angles less than several degrees), the variation in distance between the base and the retention collar will be small, resulting in motion of the retention collar in substantially a single plane that is parallel to the base plane, which can be referred to as a motion plane. As the additional fiber links tilt and/or bend in response to motion of the base because of the mechanical coupling of the tops of the additional links to the retention collar, the retention collar remains parallel to the base plane. The shearing motion illustrated in FIG. 2 is desirable from an optical point of view because the image field associated with the first fiber link can be substantially flat, which is useful in various optical configurations, or curved in a predetermined manner. Although additional fiber links are illustrated in FIG. 2, embodiments of the present invention can utilize other materials and structures for the additional links. As an example, MEMS structures can be utilized to provide the benefits inherent in embodiments of the present invention. Thus, the references to additional links, linkages, and the like should be understood to include MEMS structure including, without limitation, silicon flexures.

Figure 3:
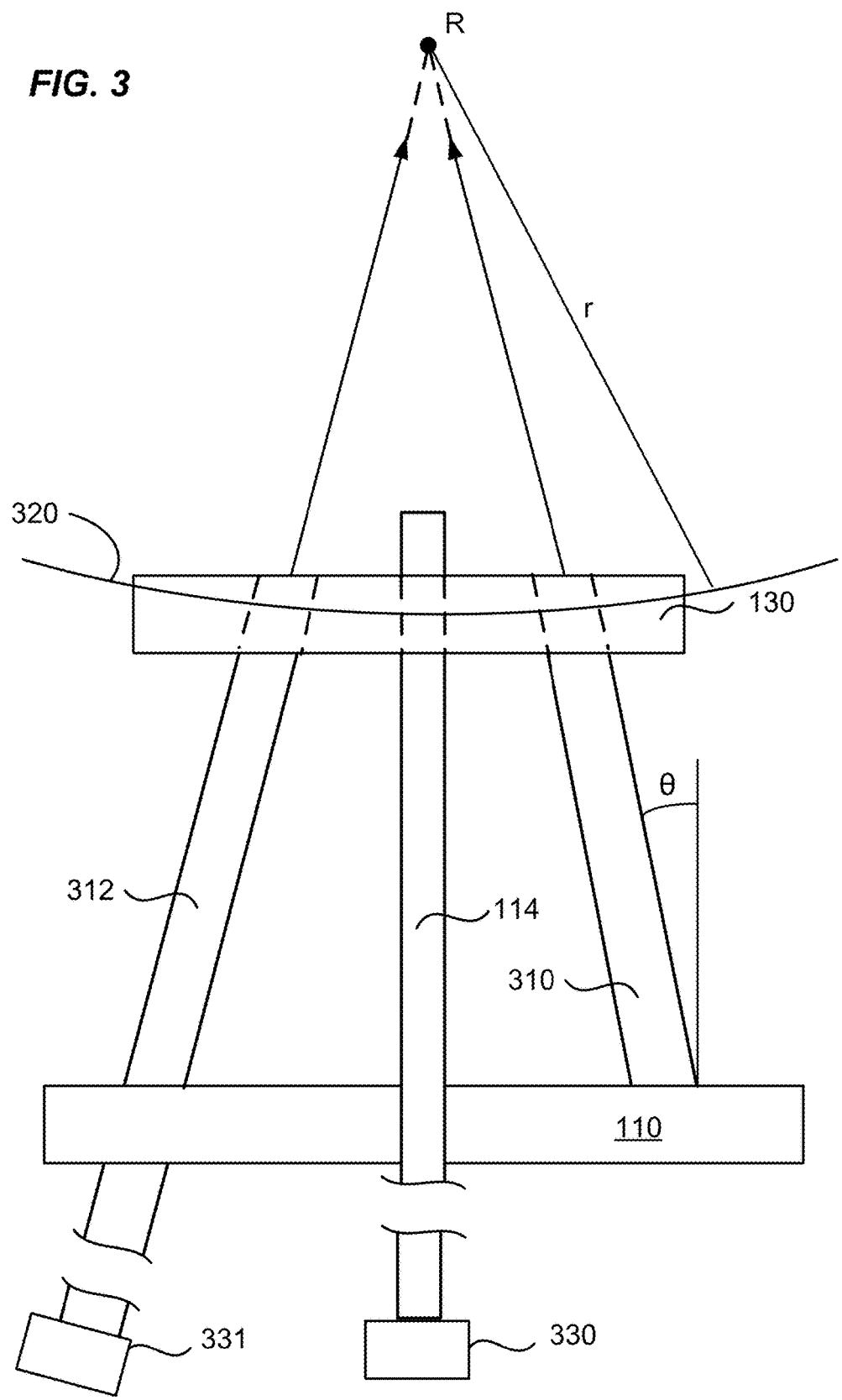
FIG. 3 is a simplified drawing illustrating a multi-element fiber scanner with tilted links according to an embodiment of the present invention.

FIG. 3 is a simplified drawing illustrating a multi-element fiber scanner with tilted links according to an embodiment of the present invention. Referring to FIG. 3, a base 110 is provided to which fiber links 310 and 312 are mechanically attached. Electromagnetic radiation source 330 (e.g., a diode laser or light emitting diode) is optically coupled to first fiber link 114. In the embodiment illustrated in FIG. 3, fiber link 312 is optically coupled to an electromagnetic radiation source 331. Thus, depending on the implementation, one or more of the plurality of additional links can pass through the base in a direction substantially parallel to the longitudinal axis and can be operatively coupled to one or more electromagnetic radiation sources. The fiber link 310 extends from the base at an angle θ and the fiber link 312 extends from the base at an opposing angle −θ such that both fiber links are tilted towards the first fiber link 114. The fiber links 310 and 312 are mechanically coupled to the retention collar 130. The first fiber link 114 can be fixed to the retention collar or can have a sliding fit in the retention collar.

Because of the tilt present in the fiber links 310 and 312, for small angles, for example, angles less than about several degrees, the motion of the retention collar 130 (and the fiber tip as a result) will follow an arc 320 that has a center coincident with the intersection point R of lines extending from the fiber links. In other words, the radius of curvature of the arc 320 is equal to r. Thus, the retention collar in this configuration translates along a curved arc, which can also be referred to as a curved oscillation section. As the retention collar oscillates, the light from the first fiber link 114 is emitted toward the intersection point R at the center of the arc, which can be referred to as a focal point. Thus, in comparison with some systems in which the emission fiber moves through a convex image field, embodiments of the present invention move the emission fiber though a concave image field such as arc 320. At large angles, the fiber tip may deviate from arc 320 and such deviations can be compensated for by modification of the optics design. One of ordinary skill in the art would recognize many variations, modifications, and alternatives.

In an embodiment, in addition to the first fiber link 114, each of the fiber links 310 and 312 carry optical signals, enabling, in this example, three fiber cores each emitting a beam, all of which are directed toward the focal point. Fabrication of this structure can start with a preform that includes structural precursors of the fiber links in the form of cylinders of a first material embedded in a larger cylinder of a second material that is more readily etched. In order to fabricate this structure, a two-step process can be used in which a first thermal drawing process is used to draw the preform in a tapered manner such that the outer or peripheral fiber cores are tilted towards the central fiber core. A subsequent laser ablation/selective etching process can then be used to remove the second material from the pillar region. Alternatively, the embodiment shown in FIG. 3 can be assembled from discrete components.

The fiber links 114, 310, and 312 can include optical fibers. They can be fabricated using methods known to those skilled in the art, such as thermal drawing. In an embodiment, the retention collar 130 and/or base 110 include a silicon, silica, or metal disk, with through holes for the fiber links. The fiber links can be coupled to the retention collar or base using adhesive, water glass, frit glass, or a metal bond. Frit glass may be applied to the connection as a preform (e.g., toroidal and surrounding the fiber) to facilitate consistent fabrication. Metal, such as gold, may be deposited on the fiber, retention collar, and/or base using, for instance, an evaporation process. A deformable microbump structure may be applied to one of the surfaces to facilitate a metal-to-metal bond under mechanical pressure. Alternatively, the metal-to-metal bond may be formed using heat. In an embodiment, the fibers are inserted through and bonded to the retention collar, and subsequently ground and polished as a unit, to ensure co-planar terminations of the optical waveguides.

Figure 4:
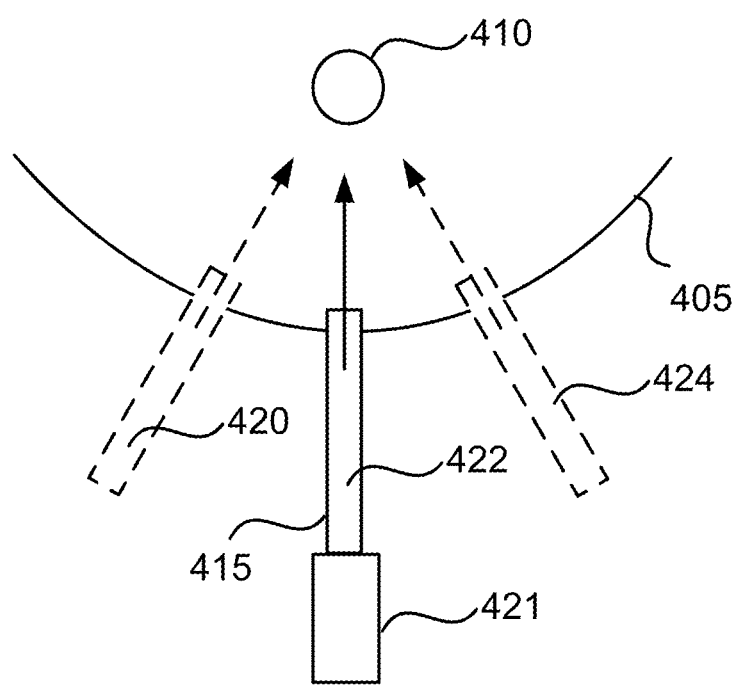
FIG. 4 is a simplified drawing illustrating elements of a fiber scanning system according to an embodiment of the present invention.

From an optical point of view, the embodiment illustrated in FIG. 3 provides benefits not available using conventional techniques. FIG. 4 is a simplified drawing illustrating elements of a fiber scanning system according to an embodiment of the present invention. As illustrated in FIG. 4, the projection system includes an electromagnetic radiation source 421 (e.g., a diode laser) optically coupled to first fiber link 415 and a ball lens 410 into which the light from the first fiber link is directed. The ball lens 410 can be positioned at approximately the intersection point or focal point R illustrated in FIG. 3 and can cover a large field of view while using a compact optical system. The ball lens could image the light from the fiber into an eyepiece of a display system. In addition to ball lenses, other entrance pupils of the optical system can be utilized as the focal point. As the first fiber link and the retention collar sweep through arc 405, the light emitted by the first fiber link is directed toward the ball lens or entrance pupil from all oscillation positions 420, 422, and 424. The tilting of the fiber tip towards ball lens 410 enables the use of optical elements that are less costly than what would otherwise be required if the fiber tip tilted away from the center as it moved toward the ends of the range of motion.

The structure of the multi-element fiber scanner is amenable to use of the laser ablation and laser sculpting techniques described in U.S. Provisional Patent Application No. 62/438,408, titled "Methods and Systems for Fabrication of Shaped Fiber Elements Using Laser Ablation", filed on Dec. 22, 2016, the disclosure of which is hereby incorporated by reference. As an example, starting with a multicore fiber preform, the preform could be drawn to form the fiber, and laser ablation and etching can be used to remove material from the pillar section, leaving behind the desired fiber links. The base and/or the retention plate could be formed of glass out of the original drawn fiber.

Figure 11:
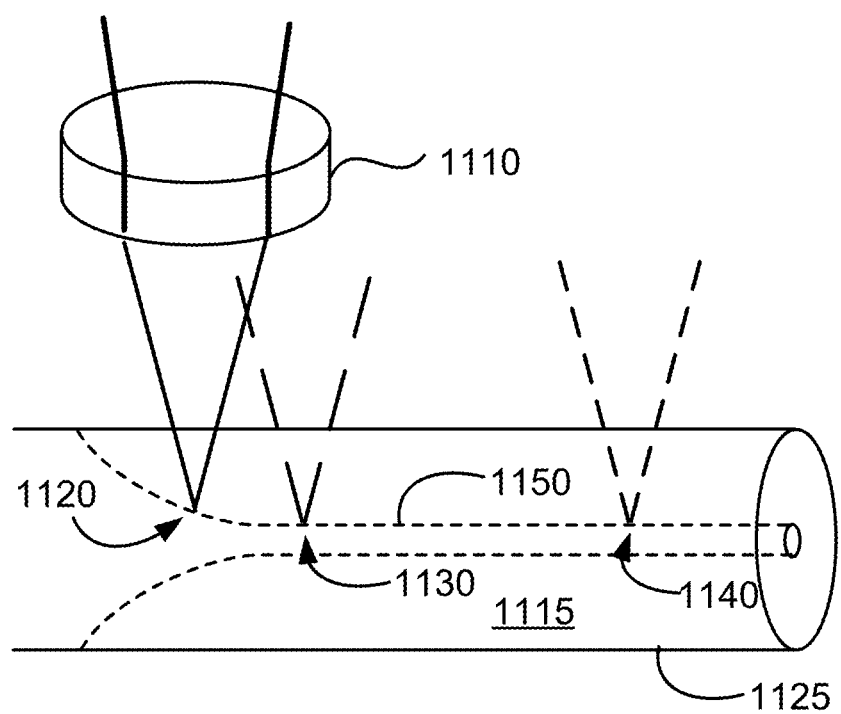
FIG. 11 is a simplified side view of a fiber optic cable and laser ablation beams according to an embodiment of the present invention.

FIG. 11 is a simplified side view of a fiber optic cable and laser ablation beams according to an embodiment of the present invention. A laser beam is provided and propagates towards lens 1110, which focuses the laser beam to a focus spot 1120 inside the cladding 1115 of optical fiber 1125. Focusing of the laser beam at the focus spot results in creation of a damage site at the focus spot. By rotating the fiber along the longitudinal axis of the fiber, which is aligned with the fiber core, a series of damage sites can be created at a given radial distance.

Movement of the laser beam, and associated optical elements, is illustrated in FIG. 11 as the laser beam is moved longitudinally to a second location such that a second focus spot 1130 is formed at a greater distance from the surface of the fiber. Upon rotation of the fiber around the longitudinal axis, a series of damage sites are created that have a smaller radial distance from the fiber core than the series of damage sites associated with focus spot 1120. A third longitudinal position is also illustrated in FIG. 11, forming third focus spot 1140. Using this process, a series 1150 of damage sites, illustrated by a dashed profile that is tapered in this embodiment, are created that are substantially continuous.

In some embodiments, the lens is moved to adjust the position of the focused spot, whereas in other embodiments, the focal power of the lens can be adjusted so the focused spot moves while the lens remains in substantially the same position. The use of the term substantially is used because focal power changes often result from moving elements inside the lens (e.g. a camera zoom lens).

As described below, an etching process can be used to preferentially etch along the series of damage sites, forming a tapered fiber profile in the embodiment illustrated in FIG. 11 and separating the portion of the fiber cladding at radial distances greater than the series of damage sites.

In some embodiments, as the light propagates into the fiber toward the fiber core, the fiber acts as a cylindrical lens in the direction extending into the figure. In the plane of the figure, the fiber does not introduce any focusing effect. The cylindrical lensing introduced by the fiber may adversely impact the size of the focus point at which the series 1150 of damage sites are created. Accordingly, an astigmatic lens can be incorporated in the optical path along which the laser beam propagates. As an example, a cylindrical lens could be used as astigmatic lens to introduce correction in the plane extending into the figure to compensate for focusing by the fiber. In some implementations, the astigmatic lens and/or the lens 1110 have variable optical parameters so that the amount of astigmatism introduced and/or the focal length can be adjusted during operation of the system.

In some embodiments, separate lenses can be combined into a single lens, which may be a multiple element compound lens, that both focuses the laser light into the fiber and provides astigmatic pre-correction to compensate for the cylindrical focusing occurring in the fiber.

Figure 12:
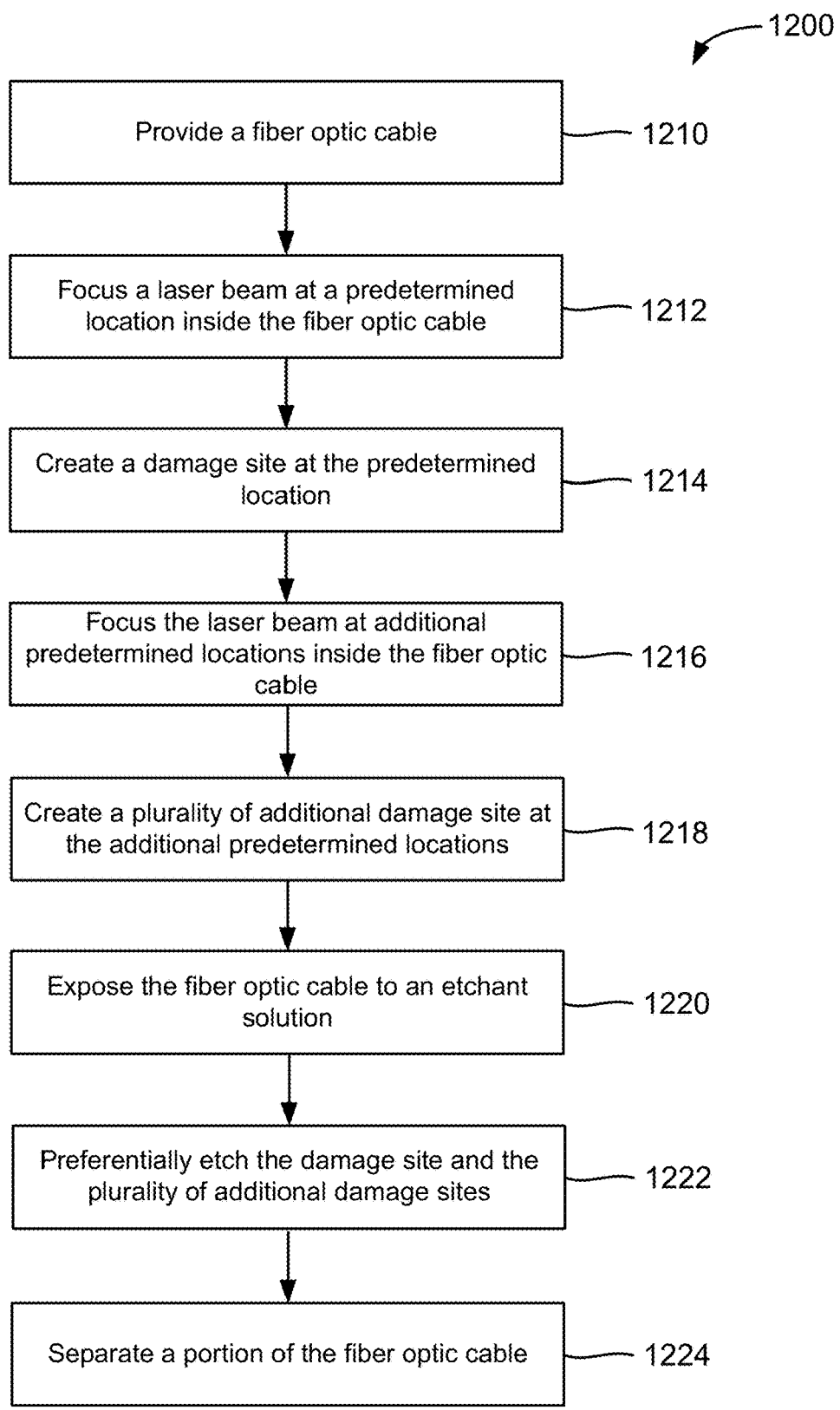
FIG. 12 is a simplified flowchart illustrating a method of fabricating a multi-element fiber scanner according to an embodiment of the present invention.

FIG. 12 is a simplified flowchart illustrating a method of fabricating a multi-element fiber scanner according to an embodiment of the present invention. The method described in relation to FIG. 12 is applicable to the fabrication of a variety of structures described herein, including a multi-element fiber scanner having a base, a retention collar, a first fiber link including a fiber core and a fiber cladding, and a plurality of additional links coupling the base to the retention collar. The method 1200 includes providing a fiber optic cable (1210), focusing a laser beam at a predetermined location inside the fiber optic cable (1212), and creating a damage site at the predetermined location (1214).

The method also includes focusing the laser beam at a series of additional predetermined locations inside the fiber optic cable (1216) and creating a plurality of additional damage sites at the additional predetermined locations (1218). In another embodiment, the damage site and the additional damage sites define a multi-element structure including waveguiding elements and mechanical support elements as illustrated in FIGS. 1, 3, 8A, and 10. The mechanical support elements can include a base and a retention collar as well as mechanical supports coupled between the base and the retention collar. In an embodiment, the damage site and the additional damage sites define a tapered profile that has a decreasing diameter as a function of longitudinal distance toward the fiber emission tip, thereby producing a tapered fiber.

The method further includes exposing the fiber optic cable to an etchant solution (1220), preferentially etching the damage site and the plurality of additional damage sites (1222), and separating a portion of the fiber optic cable to release the elements of the multi-element fiber scanner (1224). After the preferential etching process, a portion of the structure can include waveguiding elements such as one or more fiber elements having a fiber core and fiber cladding as well as mechanical structures.

According to an embodiment of the present invention, focusing of light by the fiber as the laser beam propagates to the focus point/damage site and the plurality of additional damage sites is compensated for by using an astigmatic lens that introduces an amount of focusing equal and opposite to the focusing that occurs as the laser beam propagates through the fiber. Since the damage sites will be positioned at varying depths in the fiber cladding, that is, varying distances from the core of the fiber, the correction lens can be adjusted as the laser traverses through different radial distances in the cladding of the fiber in some implementations.

In some embodiments, creating the plurality of additional damage sites at the additional predetermined locations can include forming a latticework of damage sites in the cladding of the fiber optic cable. For example, in some embodiments, a plurality of radial vias can pass through the cladding region toward the fiber core. The focus point of the laser beam can be controlled so that initially, a first portion of the plurality of additional damage sites are created adjacent the fiber core (i.e., at small radial distances from the fiber core) and subsequently, a second portion of the plurality of additional damage sites are created at farther distances from the fiber core (i.e., at larger radial distances up to the diameter of the cladding region). This technique provides damage free materials through which the laser beam propagates, reducing or preventing degradation in beam quality.

The fiber core is characterized by a longitudinal axis and the method can include rotating the fiber around the longitudinal axis while the plurality of additional damage sites are created at the additional predetermined locations. Although FIG. 11 illustrates the fiber optic cable as substantially homogeneous material, the fiber optic cable can include a cladding region and a plurality of sacrificial regions disposed in the cladding region. The plurality of sacrificial regions can include a material having a higher etch rate than the cladding region or may be air cavities through which etchant can flow.

It should be appreciated that the specific steps illustrated in FIG. 12 provide a particular method of fabricating a multi-element fiber scanner according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
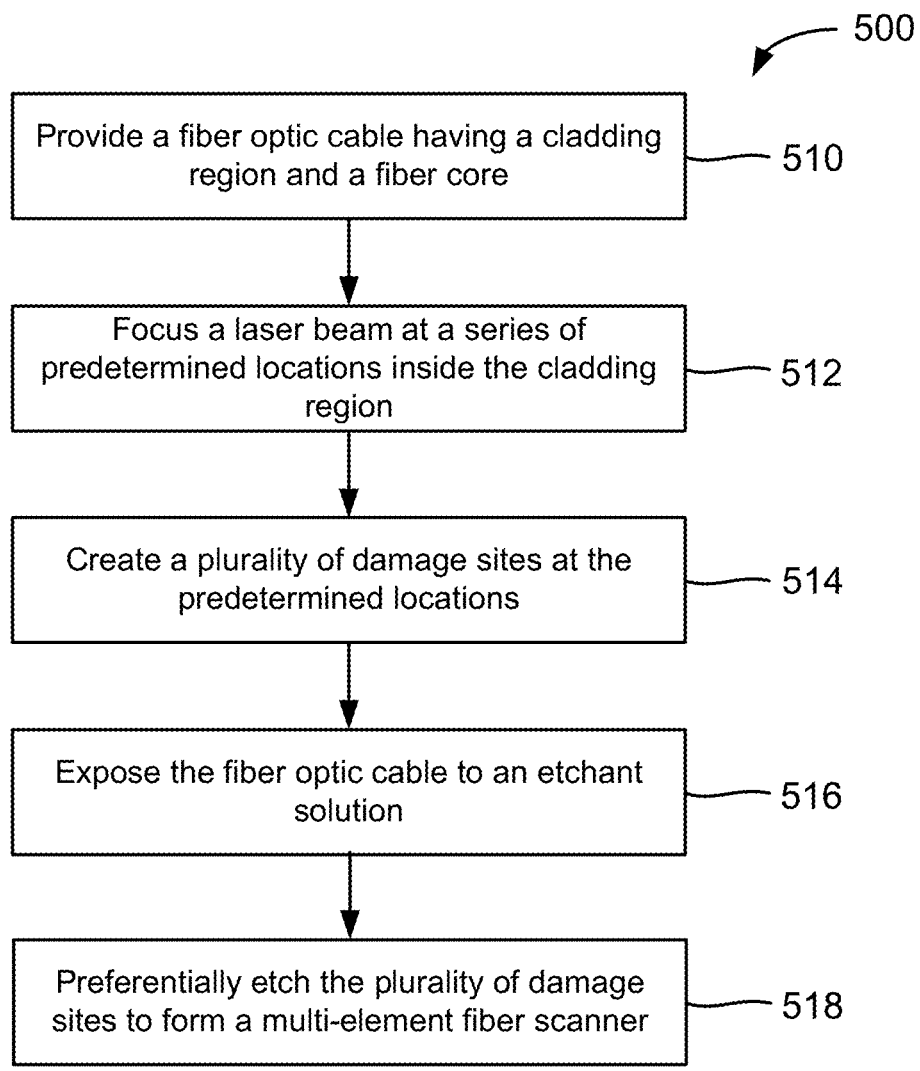
FIG. 5 is a simplified flowchart illustrating a method of fabricating a multi-element fiber scanner according to an embodiment of the present invention.

FIG. 5 is a simplified flowchart illustrating a method of fabricating a multi-element fiber scanner according to an embodiment of the present invention. The method 500 of fabricating the multi-element fiber scanner includes providing a fiber optic cable having a cladding region and a fiber core (510), focusing a laser beam at a series of predetermined locations inside the cladding region of the fiber optic cable (512), and creating a plurality of damage sites at the predetermined locations (514). Creating the plurality of damage sites at the predetermined locations can include forming a latticework of damage sites, a plurality of radial vias passing through the cladding region towards the fiber core, or the like. In one implementation, the process of creating the plurality of damage sites at the predetermined locations can be performed by initially creating a first portion of the plurality of damage sites adjacent the fiber core and subsequently creating a second portion of the plurality of damage sites adjacent a periphery of the cladding region.

The method also includes exposing the fiber optic cable to an etchant solution (516) and preferentially etching the plurality of damage sites (518) to form a base having a base plane and a longitudinal axis orthogonal to the base plane, a retention collar disposed a predetermined distance along the longitudinal axis from the base, a first fiber link including the fiber core, passing through the base plane, and joined to the retention collar, and a plurality of additional fiber links joined to the base, extending from the base to the retention collar, and joined to the retention collar.

According to an embodiment of the present invention, the method can also include rotating the fiber optic cable around the longitudinal axis during the process of creating the plurality of damage sites at the predetermined locations. In some implementations, the fiber optic cable can be fabricated such that it includes a plurality of sacrificial regions disposed in the cladding region that are made using a material that has a higher etch rate than the cladding region, enabling the sacrificial material to be preferentially removed. The sacrificial regions can alternatively include air cavities or a combination of sacrificial material and air cavities.

Figure 6:
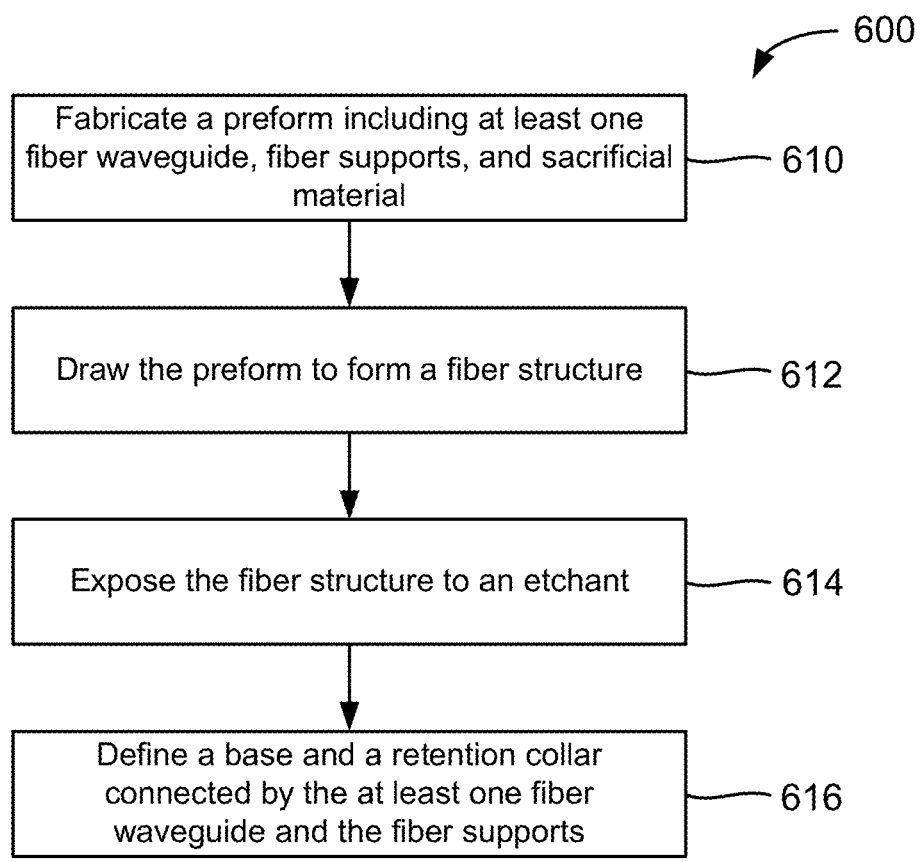
FIG. 6 is a simplified flowchart illustrating a method of fabricating a multi-element fiber scanner according to another embodiment of the present invention.

FIG. 6 is a simplified flowchart illustrating a method of fabricating a multi-element fiber scanner according to another embodiment of the present invention. The method 600 of fabricating a multi-element fiber scanner includes fabricating a preform including at least one fiber waveguide, fiber supports, and sacrificial material (610) and drawing the preform to form a fiber structure (612).

In the fiber pulling process, fiber preform can include sacrificial regions that can include material with a lower etch resistance than the materials utilized to define the first fiber link and the plurality of additional links or other mechanical supports. As an example, the first fiber link and the plurality of additional links can be resistant to etching, for example, etching by sulfuric acid or other suitable etchants, while the sacrificial regions, which can be doped or otherwise provided to lower their etch resistance (which have etch rates that depend on concentration and type of dopant as well as the etchant), can be etched by sulfuric acid. In various embodiments, the dopant can include one or more of fluorine, fluoride, germanium, boron, phosphorous, gallium, indium, arsenic, and antimony. In some embodiments, the etch rate of the fiber link and/or the plurality of additional links can be dependent on the purity of the glass (e.g., sodium/boron/phosphate content) as well as whether the glass has been annealed.

The method also includes exposing the fiber structure to an etchant solution (614) and preferentially etching the sacrificial material (616) to form a base having a base plane and a longitudinal axis orthogonal to the base plane, a retention collar disposed a predetermined distance along the longitudinal axis from the base, a first fiber link including the at least one fiber waveguide, passing through the base plane, and joined to the retention collar, and a plurality of fiber supports joined to the base, extending from the base to the retention collar, and joined to the retention collar.

The base and the retention collar can be masked off to protect them during the etching process during the preferential sacrificial etching process. The materials can be selected for their mechanical properties in addition to their optical properties. Thus, in some embodiments, the base and retention collar can be excluded from laser damage treatment in order to reduce their susceptibility to etching.

Figure 7:
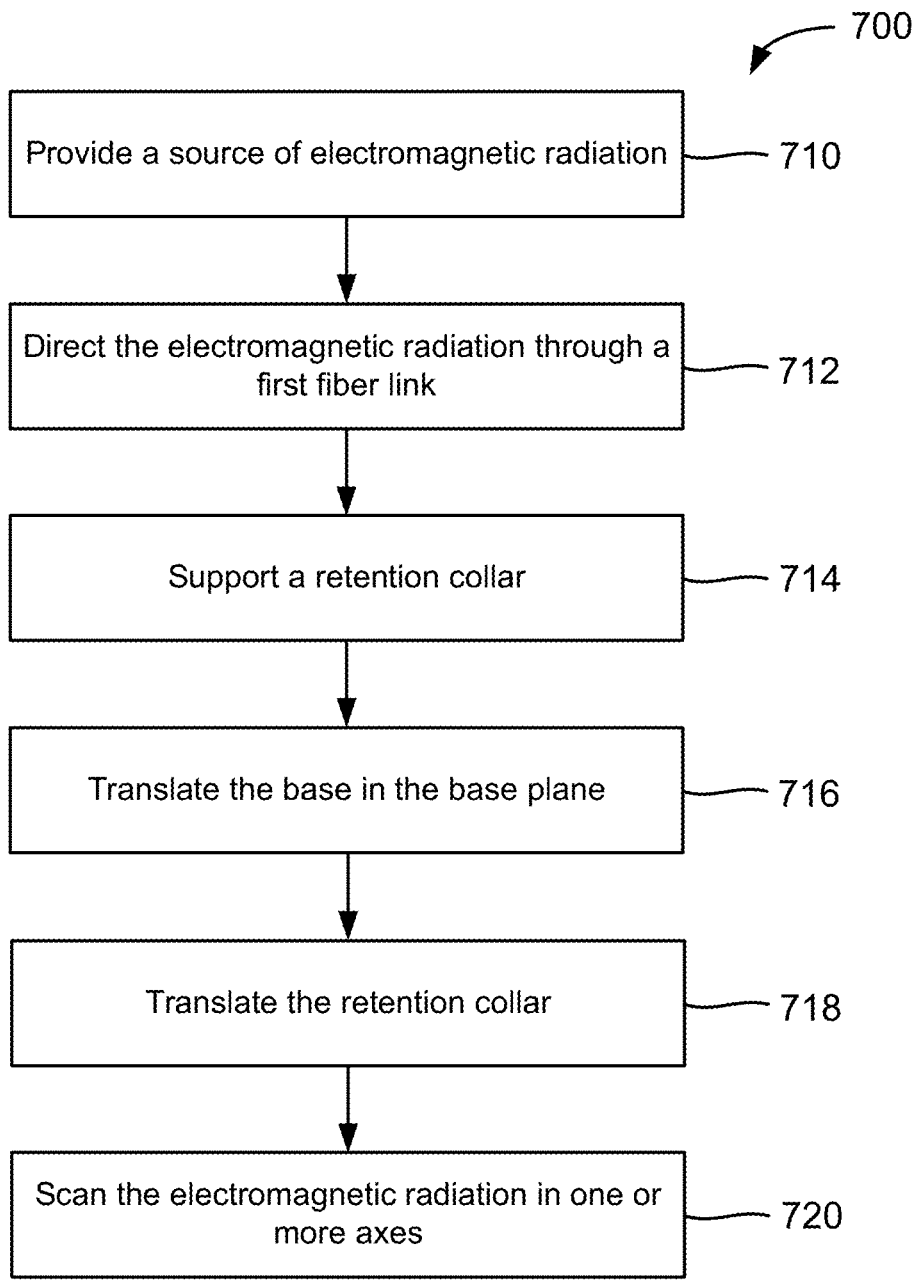
FIG. 7 is simplified flowchart illustrating a method of operating a multi-element fiber scanner according to an embodiment of the present invention.

FIG. 7 is simplified flowchart illustrating a method of operating a multi-element fiber scanner according to an embodiment of the present invention. As described below, when the actuator base is translated laterally in the base plane, the retention collar translates laterally in a set of planes as it oscillate. For small angles, the fiber tips are oscillating in substantially a single plane, which provides a flat image field. In some embodiments, the fiber tips oscillate in a set of planes while maintaining the fiber tip in a longitudinal orientation. The method 700 of operating a multi-element fiber scanner includes providing a source of electromagnetic radiation (710) and directing electromagnetic radiation from the source through a first fiber link (712). The first fiber link passes through a base having a base plane and a longitudinal axis orthogonal to the base plane.

The method also includes supporting a retention collar disposed a predetermined distance along the longitudinal axis from the base (714). A plurality of additional links join the base and the retention collar in some embodiments. One or more of the plurality of additional links can pass through the base. In this case, the method can include directing the electromagnetic radiation from the source (or from another source) through the one or more of the plurality of additional links. The electromagnetic radiation can be modulated in intensity to present an image.

The method further includes translating the base in the base plane (716), translating the retention collar in a set of planes parallel to the base plane (718), and scanning the electromagnetic radiation in one or more axes (720). Considering the motion of the retention collar, the present invention includes motion lying substantially in the plane of the retention collar for small angles. Thus, for these examples, as the retention collar oscillates laterally, it may move in the longitudinal direction out of the original plane by small amounts at the end of the range of motion. As an example, the vertical deviation from the original position of the retention collar may be in the range of microns to millimeters, for example, 500 µm or more, in some embodiments. As the angle of oscillation and the range of motion increases, the motion of the retention collar is defined by a set of planes parallel to the base plane and including vertical variation as the retention collar moves both laterally and longitudinally. As described herein, since the retention collar moves in planes parallel to the base plane, the fiber tip is oriented in the longitudinal direction during motion, providing benefits in relation to the design of the optical imaging system.

In an embodiment, translating the base in the base plane is performed by actuating the base in a first direction and actuating the base in a second direction orthogonal to the first direction to provide for two-dimensional motion. Translating the retention collar in the set of planes parallel to the base plane can include tilting the plurality of additional links.

Figure 8A:
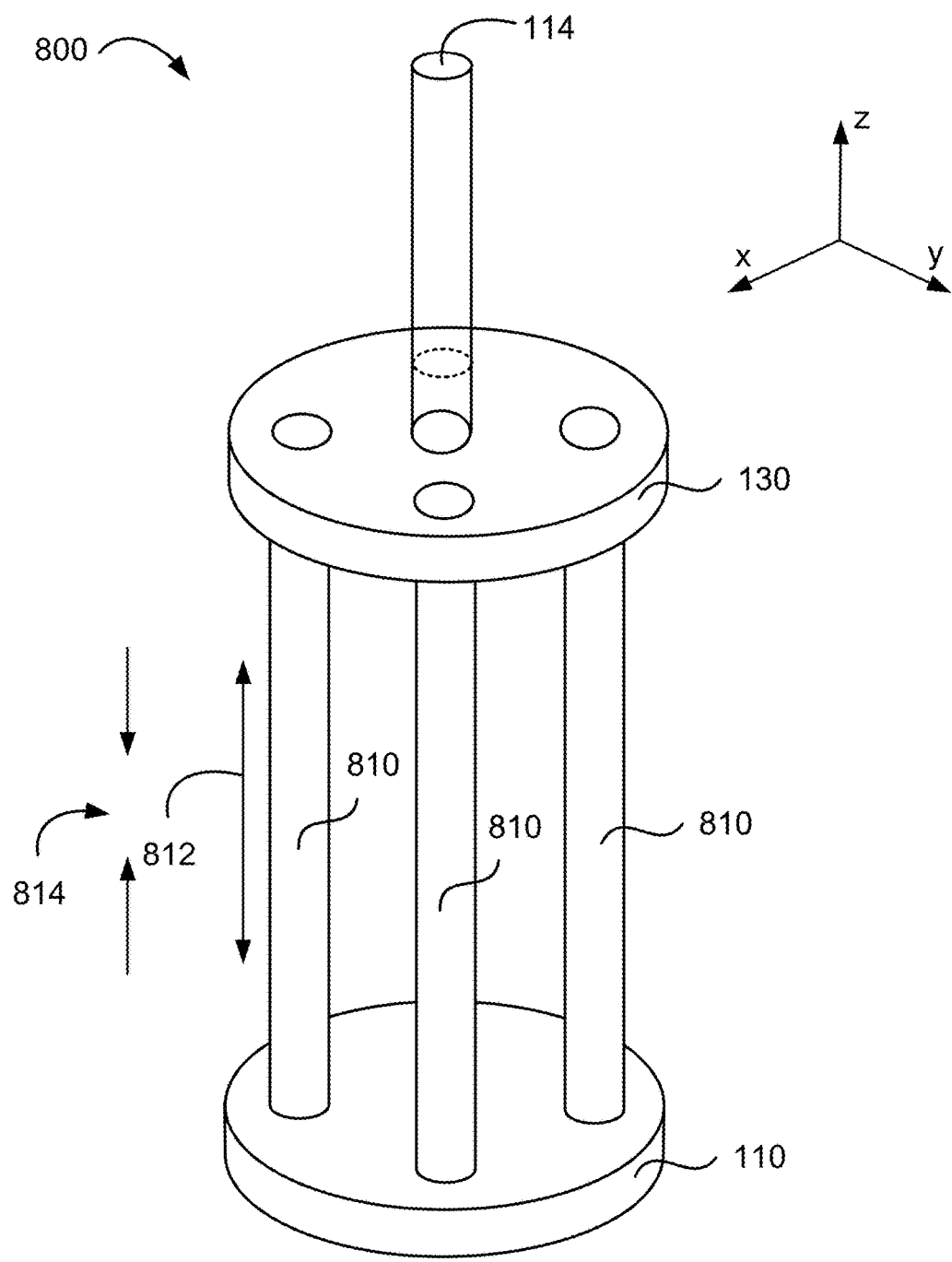
FIG. 8A is a simplified perspective drawing illustrating a multi-axis fiber scanner according to an embodiment of the present invention.

FIG. 8A is a simplified perspective drawing illustrating a multi-axis fiber scanner according to an embodiment of the present invention. The multi-element fiber scanner can be used for scanning electromagnetic imaging radiation. The multi-element fiber scanner 800 includes a base 110 having a base plane and a longitudinal axis orthogonal to the base plane. The multi-element fiber scanner also includes a first fiber link 114 passing through the base in a direction parallel to the longitudinal axis. The first fiber link is operatively coupled to at least one electromagnetic radiation source (not shown) at a location below the base 110.

Additionally, the multi-element fiber scanner includes a plurality of actuation elements 810 joined to the base 110 and extending from the base along the longitudinal axis, for example, parallel to the longitudinal axis. The plurality of actuation elements can independently expand 812 and contract 814. The use of opposing actuation elements 810 as illustrated in FIG. 8A enables independent scanning of the first fiber link in two directions (e.g., along the x-axis and the y-axis both of which are orthogonal to the longitudinal axis) such that light from the first fiber link can be directed to pixels defining an array parallel to the x-axis and y-axis and perpendicular to the longitudinal axis (i.e., the z-axis).

The plurality of actuation elements can be fabricated using a plurality of piezoelectric tube stacks and can be arrayed surrounding the first fiber link. Additional description related to piezoelectric tube stacks is provided in relation to FIGS. 9A-9F. In addition to mechanical constraint of the base with respect to the retention collar, the actuation elements 810 can be used to control the distance between the base and the retention collar 130, which is disposed a predetermined distance along the longitudinal axis from the base. The first fiber link and the plurality of actuation elements are joined to the retention collar. The first fiber link passes through the retention collar in the direction parallel to the longitudinal axis.

Referring to FIG. 8A, the actuation elements can include a first piezoelectric element positioned on a first side of the first fiber link and operable to contract/expand and a second piezoelectric element positioned on a second side of the first fiber link opposing the first side and operable to expand/contract in opposition to the first piezoelectric element. These motions will result in tilting of the retention collar around a first axis orthogonal to the line connecting the first piezoelectric element and the second piezoelectric element. Moreover, a third piezoelectric element can be positioned on a third side of the first fiber link and operable to contract/expand. This third piezoelectric element is paired with a fourth piezoelectric element that is positioned on a fourth side of the first fiber link opposing the third side and operable to expand/contract in opposition to the third piezoelectric element. Motion of the third and fourth piezoelectric elements will result in tiling of the retention collar around a second axis orthogonal to the line connecting the third piezoelectric element and the fourth piezoelectric element.

Using the actuation elements as described above to operate the multi-element fiber scanner, the first fiber link can be scanned to move an electromagnetic radiation point along an axis parallel to the base plane. In this embodiment, the scanning functionality is built into the mechanical supports, for example, with piezoelectric actuators functioning as servo elements (e.g., pistons).

Although the actuation elements are illustrated as cylindrical in the embodiment illustrated in FIG. 8A, this particular shape is not required by the present invention and other cross-sections, including rectangular, square, hexagonal, and the like are included within the scope of the present invention. The cross-section of the actuation elements may be uniform along the length of the actuation elements or non-uniform.

Figure 8B:
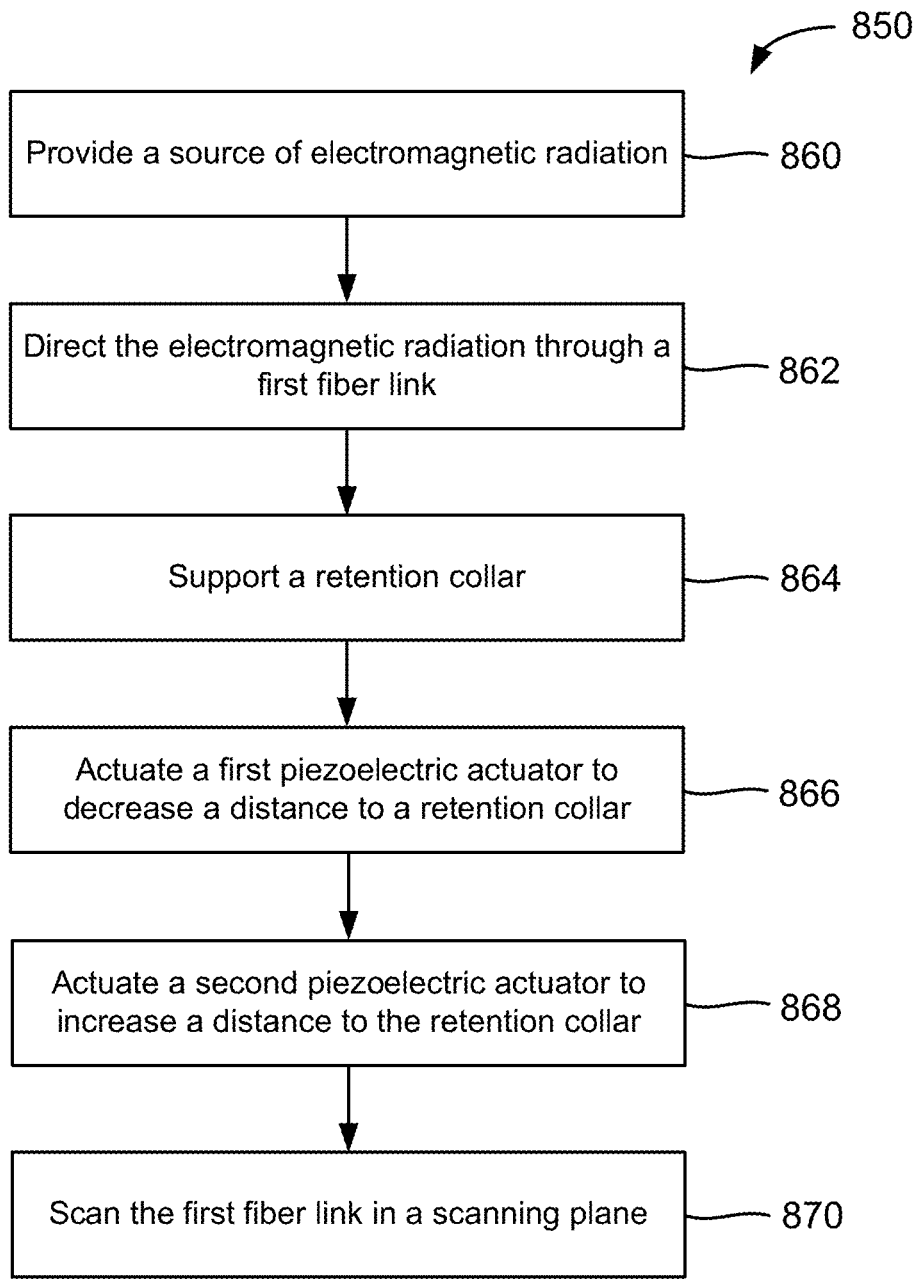
FIG. 8B is a simplified flowchart illustrating a method of operating a multi-axis fiber scanner according to an embodiment of the present invention.

FIG. 8B is a simplified flowchart illustrating a method of operating a multi-axis fiber scanner according to an embodiment of the present invention. The method 850 of operating the multi-element fiber scanner includes providing a source of electromagnetic radiation (860) and directing electromagnetic radiation from the source through a first fiber link (862). The first fiber link passes through a base having a base plane and along a longitudinal axis orthogonal to the base plane. The method also includes supporting a retention collar disposed a predetermined distance along the longitudinal axis from the base (864). A plurality of piezoelectric actuators join the base and the retention collar. As illustrated in FIG. 8A, a first piezoelectric actuator of the plurality of piezoelectric actuators joins one side of the base to one side of the retention collar and a second piezoelectric actuator of the plurality of piezoelectric actuators joins an opposing side of the base to an opposing side of the retention collar. The first piezoelectric actuator and the second piezoelectric actuator lie in a scanning plane. In some embodiments, the scanning plane may include the central waveguide/fiber, but by means of two other actuators, the tip of the fiber may not be restricted to a plane that includes the rest positions of two opposed piezoelectric actuators and the central waveguide/fiber. Accordingly, one mode of operation is to drive a first pair of opposed actuators at the resonant frequency of the fiber and the remaining (e.g., two) opposed actuators at a lower frequency that can be associated with the vertical scan frequency. In yet another mode of operation, a spiral scan pattern is utilized.

The method further includes actuating the first piezoelectric actuator of the plurality of piezoelectric actuators to decrease the distance from the one side of the base to the one side of the retention collar (866) and actuating the second piezoelectric actuator of the plurality of piezoelectric actuators to increase the distance from the opposing side of the base to the opposing side of the retention collar (868). In response to these actuations, the method enables the first fiber link to be scanned in the scanning plane (870).

Figures 9A, 9B:
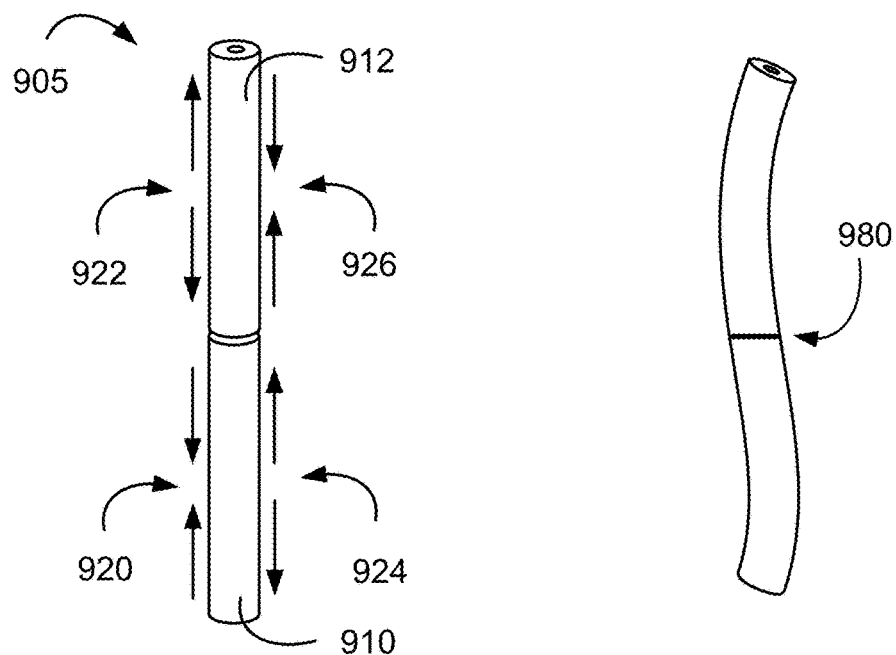
FIG. 9A is a simplified side view illustrating a multi-section motion actuation element according to an embodiment of the present invention.
FIG. 9B is a simplified side view illustrating an oscillatory motion of the multi-section motion actuation element illustrated in FIG. 9A according to an embodiment of the present invention.

FIG. 9A is a simplified side view illustrating a multi-section motion actuation element according to an embodiment of the present invention. As illustrated in FIG. 9A, the multi-section element 905 includes a first piezoelectric element 910 that is coupled to a second piezoelectric element 912. The multi-section element 905 can be referred to as a piezoelectric tube stack since several piezoelectric elements are stacked to form the element. In some embodiments, the first piezoelectric element 910 is proximate to the base and the second piezoelectric element 912 is positioned at a location distal from the base. Each of the piezoelectric elements is able to contract or expand and, as illustrated in FIG. 9A, the piezoelectric elements can be operated such that the lower section contracts/expands while the upper section expands/contracts. In some embodiments, each piezoelectric element includes multiple sectors (e.g., 4 sectors) such that one side of each tube can be contracted while the other side is expanded. This mode of operation will produce an oscillatory motion as illustrated in FIG. 9B.

FIG. 9B is a simplified side view illustrating an oscillatory motion of the multi-section motion actuation element illustrated in FIG. 9A according to an embodiment of the present invention. As the first piezoelectric element 910 contracts (920), the second piezoelectric element 912 expands (922), causing the multi-section motion actuation element to take on a sigmoid shape. At the next stage of oscillation, as the first piezoelectric element 910 expands (924), the second piezoelectric element 912 contracts (926), causing the multi-section motion actuation element to take on a second sigmoid shape that mirrors the first sigmoid shape. By alternately expanding/contracting the piezoelectric elements making up the sections, the multi-section element will oscillate as illustrated by FIG. 9B, forming the illustrated shape and the horizontal mirror image in an alternating manner.

Figure 9C:
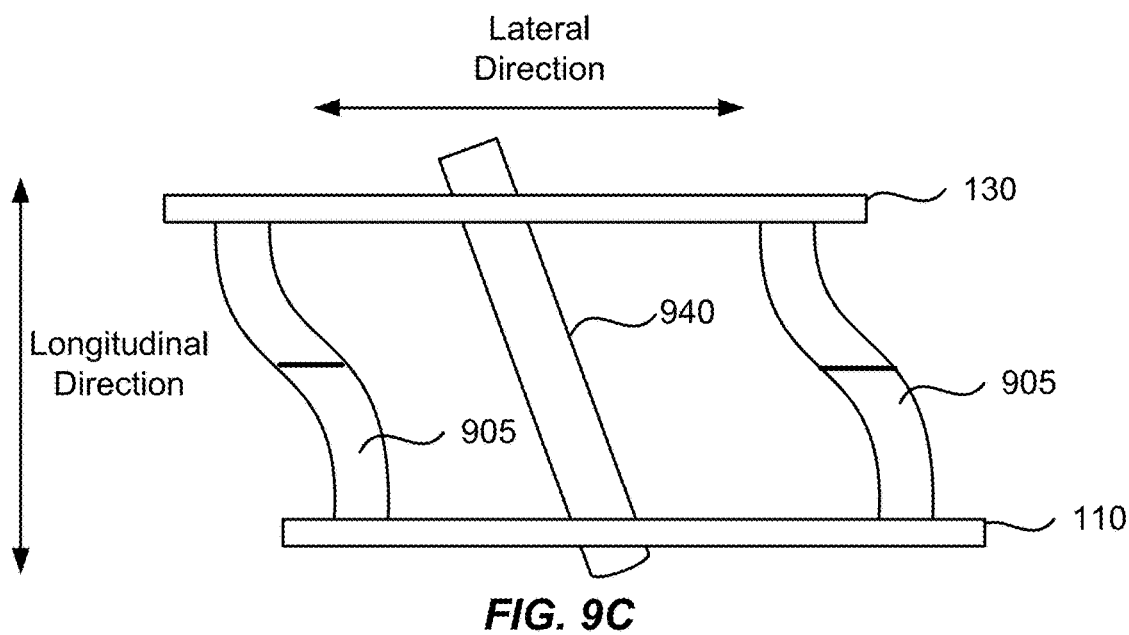
FIG. 9C is a simplified side view illustrating a multi-element fiber scanner with the multi-element motion actuation element illustrated in FIG. 9A according to an embodiment of the present invention.

FIG. 9C is a simplified side view illustrating a multi-element fiber scanner with the multi-element motion actuation element illustrated in FIG. 9A according to an embodiment of the present invention. As illustrated in FIG. 9C, the use of the multi-section motion elements 905 coupling the base 110 to the retention collar 130 reduce the amount of bending at the locations where the bottoms and tops of the actuation elements join to the base and retention collar, respectively. Because of the reduced bending at these points, the stress is reduced and the lifetime and reliability can be improved. As illustrated in FIG. 9C, the vertical distance between the retention collar 130 and the base 110 (measured along the longitudinal direction) decreases as the retention collar moves horizontally away from the center position in the lateral direction. For small oscillations of the retention collar 130, the motion of the retention collar will be substantially planar. As the retention collar moves laterally away from the center, although the longitudinal height may decrease, the motion lies in planes parallel to the base plane, and the orientation of the retention collar remains substantially parallel to the base. Because the retention collar remains parallel to the base plane as it moves, the tip of the fiber 940 remains oriented along the longitudinal direction. The field curvature associated with the lateral (and longitudinal) motion of the retention collar can be taken into account in designing optical systems to produce an image of the fiber as it is scanned. Fiber scanners in which the fiber tip tilts away from the center as it moves laterally toward the ends of the range of motion necessitate a larger numerical aperture optical system to efficiently collect and image light from the fiber. The larger numerical aperture requirement generally leads to a larger, more complicated and more costly optical system. The size of the optical system is a significant consideration for optical systems that are to be integrated into augmented reality glasses. In contrast, embodiments of the present invention maintain the fiber tip in a longitudinal orientation because the retention collar is parallel to the base plane throughout the range of motion. As the tip tilts at the end of the range of motion, light can be emitted at steep angles, which can result in a more complicated and expensive lens design as a result of the need to correct for high levels of field curvature and steep angles. Using embodiments of the present invention, maintaining the fiber tip direction as the fiber scans greatly simplifies the complexity and cost of the lens. One of ordinary skill in the art would recognize many variations, modifications, and alternatives.

Figure 9D:
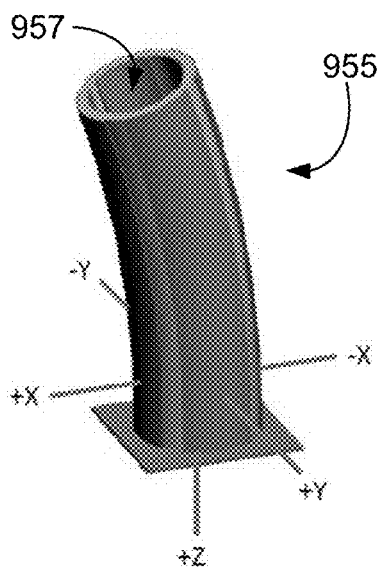
FIG. 9D is a simplified perspective view of a piezoelectric motion actuator according to an embodiment of the present invention.

FIG. 9D is a simplified perspective view of a piezoelectric motion actuator according to an embodiment of the present invention. The piezoelectric motion actuator 955 illustrated in FIG. 9D includes four actuation inputs (+X, −X, +Y, and −Y) disposed in a cylindrical casing. The fiber optic cable passes through the orifice 957 and by actuation of the four actuation inputs, the fiber optic cable can be scanned in two dimensions. In FIG. 9D, contraction of the +X actuation input and expansion of the −X actuation input causes the piezoelectric motion actuator to tilt toward the +X axis. Although the motion illustrated in FIG. 9D is in two dimensions (i.e., along planes defined by the x-axis and y-axis), embodiments of the can also expand or contract all four actuation inputs in unison to contract/expand along the z-axis. Thus, embodiments of the present invention provide for both motion in the x-direction and the y-direction, as well as the use of cylindrical actuators that compress/expand in the z-direction.

Figure 9E:
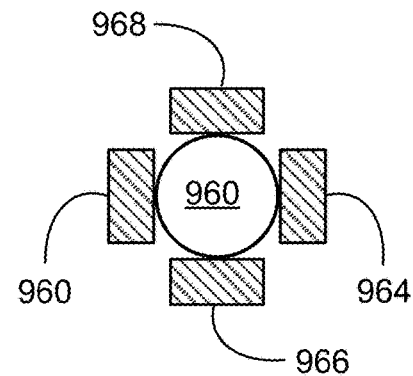
FIG. 9E is a simplified end view illustrating a multi-element motion actuator according to an embodiment of the present invention.

In addition to the cylindrical motion actuator illustrated in FIG. 9D, the scope of the present invention includes implementations in which other geometries are utilized for the motion actuator. As an example, in an embodiment, the motion actuator includes a plurality of opposing motion actuation elements (e.g., piezoelectric elements) that operate in conjunction with each other as a multi-element motion actuator. FIG. 9E is a simplified end view illustrating a multi-element motion actuator according to an embodiment of the present invention. The view illustrated in FIG. 9E is aligned with the longitudinal axis. As illustrated in FIG. 9E, a first motion actuation element 962 positioned on one side of the fiber optic cable 960 and a second motion actuation element 964 positioned on the opposite side of the fiber optic cable can contract/expand in concert to cause the fiber optic cable to move in the horizontal plane. A third motion actuation element 966 positioned on a third side of the fiber optic cable 960 and a fourth motion actuation element 968 positioned on the opposite side of the fiber optic cable can contract/expand in concert to cause the fiber optic cable to move in the vertical plane. By actuation of all four motion actuation elements, the fiber can be scanned in two dimensions as appropriate to use in a projection display. The embodiment illustrated in FIG. 9E can provide for a lighter system by reducing the piezoelectric mass. In addition to the rectangular geometry illustrated in FIG. 9E, other geometries, including hexagonal, triangular, and the like are included within the scope of the present invention.

Typically, the actuation inputs are driven with a predetermined phase relationship between the inputs, for example, 90° out of phase, 180° out of phase, or the like. As an example, to achieve the motion illustrated in FIG. 9D, contraction of the +X actuation input and expansion of the −X actuation input can be accomplished by driving these actuation inputs by signals that are 180° out of phase with respect to each other. Referring to FIGS. 9A and 9C, the first piezoelectric element 910 can be driven as illustrated in FIG. 9D, causing this first element to bend toward the +X direction. Concurrently, the second piezoelectric element 912 can be driven in an opposite manner, i.e., expansion of the +X actuation input and contraction of the −X actuation input, causing this second element to bend toward the −X direction. As a result, the motion illustrated in FIG. 9B can be achieved by the concerted actuation of these piezoelectric elements. Thus, the phase relationship between the actuation inputs of each element and the phase relationship between the various elements are controlled to achieve the desired motion.

Figure 9F:
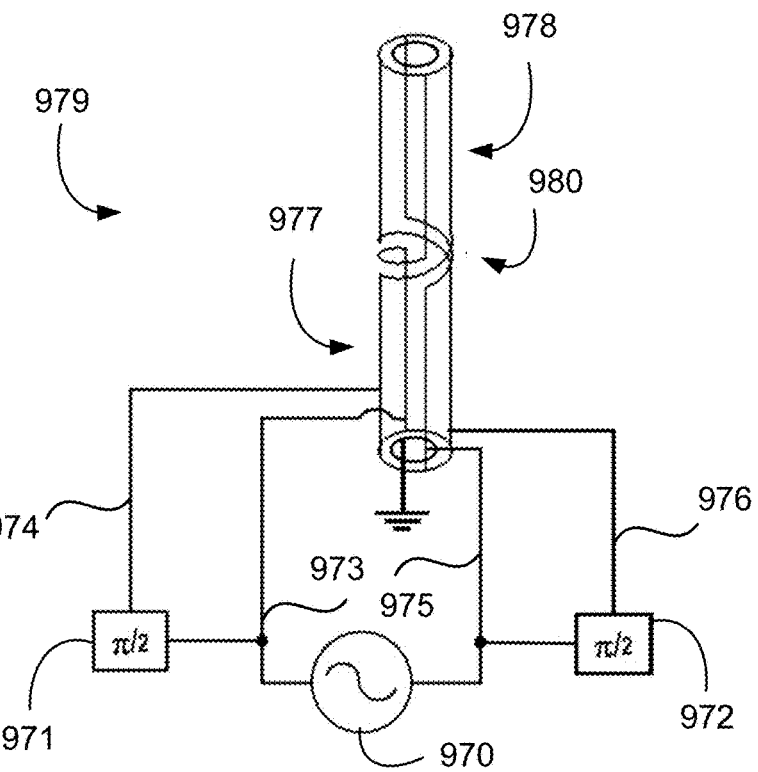
FIG. 9F is a simplified side view illustrating a multi-section motion actuation structure according to an embodiment of the present invention.

FIG. 9F is a simplified side view illustrating a multi-section motion actuation structure according to an embodiment of the present invention. As illustrated in FIG. 9F, a piezoelectric structure 979 includes two piezoelectric elements similar to the multi-section element illustrated in FIG. 9A. The piezoelectric structure 979 can be referred to as a piezoelectric tube stack since two piezoelectric elements (also referred to as piezoelectric motion actuators) are stacked to form the structure in this embodiment. The lower portion of the piezoelectric structure 979 is attached to a fixed base, enabling the top of the structure to move in response to the electrode drive voltages. Comparing FIGS. 9A, 9D, and 9F, the single piezoelectric element illustrated in FIG. 9D would be stacked together with a second piezoelectric element to form the tube stack illustrated in FIGS. 9A and 9F. For purposes of clarity, the actuation inputs (see FIG. 9D) on the outside surfaces of the piezoelectric elements are omitted and the electrodes connected to the actuation inputs are illustrated. The interior of the piezoelectric elements are metallized and connected to ground. As described herein, four phases are applied to the actuation inputs arranged at 90° orientations with respect to each other around the outside surfaces of the piezoelectric elements.

Although a tube stack is discussed in relation to FIG. 9F, embodiments of the present invention are not limited to multi-piezoelectric element implementations. In some embodiments, a monolithic multi-section piezoelectric element having a lower section and an upper section can be utilized that is fabricated from a monolithic piezoelectric tube. According to an alternative embodiment, a fiber optic with modulated light can pass through the piezoelectric structure 979. Thus, these piezoelectric structures are useful not only for mechanical functionality but for light delivery as well.

Signal generator 970 provides outputs that are connected to electrodes 973 and 975, which are, in turn, connected to corresponding actuation inputs (e.g., +Y, and −Y in FIG. 9D). Signal generator 970 is also connected to a first 90° phase shifter 971 and a second 90° phase shifter 972, which are connected to electrodes 974 and 976, which are, in turn, connected to corresponding actuation inputs (e.g., +X and −X in FIG. 9D). Thus, the signal generator, in concert with the phase shifters provides four phases that are 90° out of phase with respect to each other.

At the intersection 980 of the first and second piezoelectric elements, the electrodes form a helix structure that shifts the position of the electrode by 180°. This helix structure enables a 180° interchange of the piezoelectric drive electrodes at the intersection 980, which corresponds to the inflection point of the S-curve. Accordingly, for example, electrode 974, which is in contact with the actuation input in region 977 (i.e., the left side of the first piezoelectric element) shifts to be in contact with the actuation input in region 978 (i.e., the right side of the second piezoelectric element). Similar 180° shifts of the electrode position occur for the other electrodes, resulting in the electrodes contacting the right/left or front/back sides of the first piezoelectric element also contacting the left/right or back/front sides of the second piezoelectric element. As an example, the phase shift between electrodes for the first piezoelectric element can be defined as 0° for electrode 973 (i.e., front actuation input), 90° for electrode 974 (left actuation input), 180° for electrode 975 (i.e., back actuation input), and 270° for electrode 976 (i.e., right actuation input).

In operation, the field is applied radially from the actuation inputs on the outer surface of the piezoelectric element to the common grounded electrode on the inner surface of the piezoelectric element. Because the left/right and front/back actuation inputs are driven by electrodes that are 180° out of phase, contraction of the left/front side of the piezoelectric element and expansion of the right/back side of the piezoelectric element. In the embodiment illustrated in FIG. 9F, the presence of the helix structure at intersection 980 results in opposing actuation inputs on the two piezoelectric elements to respond in the same manner. For example, since the +X actuation input on the first piezoelectric element and the −X actuation input on the second piezoelectric element are connected to the same electrode (e.g., electrode 974), they will both contract/expand in unison. Accordingly, S-curve operation as illustrated in FIG. 9B results from the electrode drive configuration illustrated in FIG. 9F in the case that region 977 contracts and region 978 contracts in response to the voltage present on electrode 974. Since the electrodes on the opposite side of the piezoelectric elements are 180° out of phase, expansion of the regions opposing regions 977 and 978 will contribute to the S-curve operation.

As the voltages applied to the four actuation inputs of each actuation input are varied as a function of time, the free end 981 of the second piezoelectric element can sweep out a circle lying in a plane perpendicular to the longitudinal direction (i.e., the z-direction).

Referring once again to FIG. 8A and FIGS. 9A-9F, in some embodiments, one or more of the fiber links can be replaced with motion actuation links, for example, incorporating the multi-section motion actuation elements illustrated in FIG. 9A. Accordingly, an embodiment of the present invention provides a multi-element fiber scanner for scanning electromagnetic imaging radiation. The multi-element fiber scanner includes a base having a base plane and a longitudinal axis orthogonal to the base plane and a first fiber link passing through the base in a direction parallel to the longitudinal axis. The first fiber link is operatively coupled to at least one electromagnetic radiation source.

The multi-element fiber scanner also includes a plurality of motion actuation links joined to the base and extending from the base. Each of the plurality of motion actuation links includes a first piezoelectric element proximate to the base and a second piezoelectric element coupled to the first piezoelectric element at a location distal from the base. The multi-element fiber scanner further includes a retention collar disposed a predetermined distance along the longitudinal axis from the base. The first fiber link and the second piezoelectric element of each of the plurality of motion actuation links are joined to the retention collar.

Figure 10:
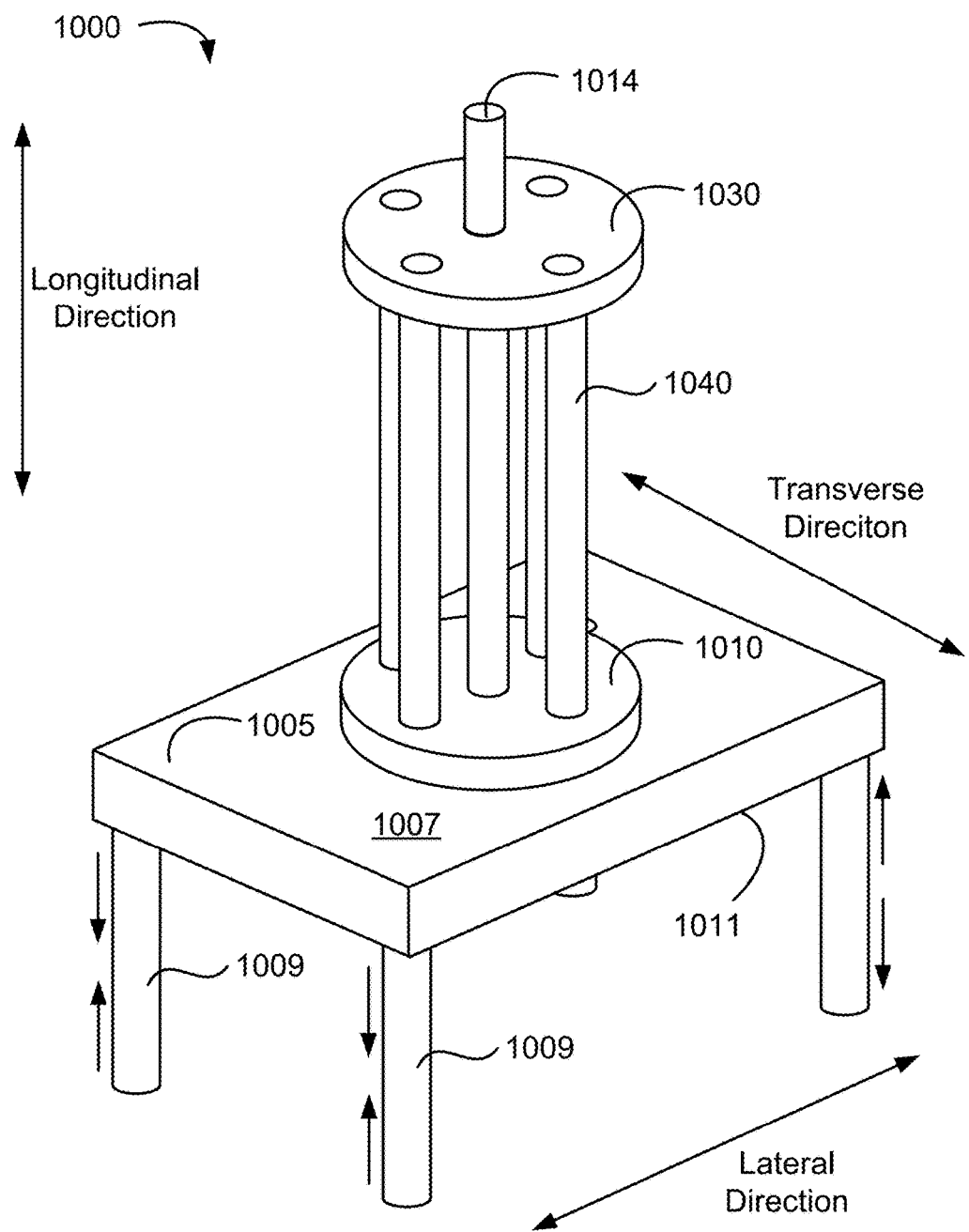
FIG. 10 is a multi-element fiber scanner for scanning electromagnetic imaging radiation according to an embodiment of the present invention.

FIG. 10 is a multi-element fiber scanner for scanning electromagnetic imaging radiation according to an embodiment of the present invention. The multi-element fiber scanner 1000 can be used in a display that scans electromagnetic imaging radiation and includes a base 1005 having a support surface 1011 (lower surface of base 1005) defining a base plane, a mounting surface 1007 opposing the support surface 1011, and a longitudinal axis orthogonal to the base plane. The multi-element fiber scanner also includes a plurality of motion actuators 1009 coupled to the support surface 1011 of the base 1005.

A multi-link fiber structure is coupled to the mounting surface 1007. The multi-link fiber structure includes a fiber base 1010, which can be similar to base 110 and a fiber link 1014 passing through the fiber base 1010 in a direction parallel to the longitudinal axis. The fiber link 1014 is operatively coupled from at least one electromagnetic radiation source (not shown) to the distal (top in the perspective of FIG. 10) end of the fiber link 1014.

The multi-link fiber structure also includes a plurality of motion actuation elements 1040 (e.g., piezoelectric actuation elements) joined to the fiber base 1010 and extending from the fiber base 1010 along the longitudinal axis and a retention collar 1030 disposed a predetermined distance along the longitudinal axis from the fiber base. The fiber link 1014 and the plurality of motion actuation elements 1040 are joined to the retention collar 1030.

In an embodiment, one or more of the plurality of motion actuation elements 1040 are replaced with additional links coupled to electromagnetic radiation sources. Moreover, a number of additional links coupled to the same or a different source of electromagnetic radiation can be utilized to simultaneously output multiple pixels for a multi-pixel display.

Actuation of the base 1005 using the plurality of motion actuators 1009 acting as pistons results in tilting of the base around the axes of the base 1005. Tilting can be around a single axis or around multiple axes. In some embodiments, tilting of the base and actuation of the motion actuation elements to tilt the retention collar provide for control of the movement, e.g., oscillation, of the fiber link to direct light emitted from the fiber link toward a display screen.

In some configurations, translation and/or tilting of the retention collar can provide scanning of the fiber link in a first direction and tilting of the base can provide for scanning of the fiber link in a second direction, which can be orthogonal to the first direction. In an embodiment, the first direction is a fast direction (analogous to the horizontal scan of a raster scanned display) and the second direction is a slow direction (analogous to the vertical scan rate of a raster scanned display). As an example, the retention collar could be oscillated in the transverse direction and the base could be tilted in the lateral direction. In addition to tiling of the base, the base can be translated in the longitudinal direction by expanding/contracting all of the motion actuators in unison.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A multi-element fiber scanner for scanning electromagnetic imaging radiation, the multi-element fiber scanner comprising:
   a base having a base plane and a longitudinal axis orthogonal to the base plane;
   a first fiber link passing through the base in a direction parallel to the longitudinal axis, wherein the first fiber link is operatively coupled to at least one electromagnetic radiation source;
   a plurality of additional links, each spatially separated by an air gap, joined to the base, and extending from the base, wherein the first fiber link passes through the base independently from the plurality of additional links and the first fiber link and each of the plurality of additional links are spatially separated by air gaps; and
   a retention collar disposed a predetermined distance along the longitudinal axis from the base, wherein the first fiber link and the plurality of additional links are separately joined to the retention collar.

2. The multi-element fiber scanner of claim 1 wherein the first fiber link passes through the retention collar in the direction parallel to the longitudinal axis.

3. The multi-element fiber scanner of claim 1 further comprising a piezoelectric actuator mechanically coupled to the base and operable to translate the base in the base plane.

4. The multi-element fiber scanner of claim 3 wherein the retention collar is operable to translate in a set of planes parallel to the base plane.

5. The multi-element fiber scanner of claim 1 wherein one or more of the plurality of additional links pass through the base parallel to the longitudinal axis and are operatively coupled to the at least one electromagnetic radiation source.

6. The multi-element fiber scanner of claim 1 wherein the plurality of additional links are arrayed surrounding the first fiber link.

7. The multi-element fiber scanner of claim 1 wherein the plurality of additional links extend from the base in the direction parallel to the longitudinal axis.

8. The multi-element fiber scanner of claim 1 wherein the plurality of additional links extend from the base at an angle tilted towards the first fiber link.

9. The multi-element fiber scanner of claim 8 wherein the retention collar is operable to translate along a curved arc.

10. The multi-element fiber scanner of claim 8 wherein the first fiber link is operable to emit the electromagnetic imaging radiation toward a focal point.

11. A method of operating a multi-element fiber scanner, the method comprising:

provemiding a source of electromagnetic radiation;

directing electromagnetic radiation from the source of electromagnetic radiation through a first fiber link, wherein the first fiber link passes through a base having a base plane and a longitudinal axis orthogonal to the base plane;

supporting a retention collar disposed a predetermined distance along the longitudinal axis from the base, wherein a plurality of additional links that are each spatially separated by an air gap separately join the base and the retention collar, wherein the first fiber link passes through the base independently from the plurality of additional links and the first fiber link and each of the plurality of additional links are spatially separated by air gaps;

translating the base in the base plane;

translating the retention collar in a set of planes parallel to the base plane; and scanning the electromagnetic radiation in one or more axes.

12. The method of claim 11 wherein translating the base in the base plane comprises actuating the base in a first direction and actuating the base in a second direction orthogonal to the first direction.

13. The method of claim 11 wherein translating the retention collar in the set of planes parallel to the base plane comprises tilting the plurality of additional links.

14. The method of claim 11 wherein one or more of the plurality of additional links pass through the base, the method further comprising directing the electromagnetic radiation from the source of electromagnetic radiation through the one or more of the plurality of additional links.

15. The method of claim 11 wherein the electromagnetic radiation is modulated in intensity.

16. A multi-element fiber scanner for scanning electromagnetic imaging radiation, the multi-element fiber scanner comprising:

a base having a base plane and a longitudinal axis orthogonal to the base plane;

a first fiber link passing through the base in a direction parallel to the longitudinal axis, wherein the first fiber link is operatively coupled to at least one electromagnetic radiation source;

a plurality of actuation elements joined to the base and extending from the base along the longitudinal axis, wherein:

each of the plurality of actuation elements is spatially separated by an air gap; and the first fiber link passes through the base independently from the plurality of actuation elements and the first fiber link and each of the plurality of actuation elements are spatially separated by air gaps; and a retention collar disposed a predetermined distance along the longitudinal axis from the base, wherein the first fiber link and the plurality of actuation elements are separately joined to the retention collar.

17. The multi-element fiber scanner of claim 16 wherein the first fiber link passes through the retention collar in the direction parallel to the longitudinal axis.

18. The multi-element fiber scanner of claim 16 wherein the plurality of actuation elements comprise a plurality of piezoelectric tube stacks.

19. The multi-element fiber scanner of claim 16 wherein the plurality of actuation elements comprise a first piezoelectric element positioned on a first side of the first fiber link and operable to contract/expand and a second piezoelectric element positioned on a second side of the first fiber link opposing the first side and operable to expand/contract in opposition to the first piezoelectric element.

20. The multi-element fiber scanner of claim 16 wherein the plurality of actuation elements further comprise a third piezoelectric element positioned on a third side of the first fiber link and operable to contract/expand and a fourth piezoelectric element positioned on a fourth side of the first fiber link opposing the third side and operable to expand/contract in opposition to the third piezoelectric element.

* * * * *